US011423725B1

(12) United States Patent
Del Pino Ruiz et al.

(10) Patent No.: US 11,423,725 B1
(45) Date of Patent: Aug. 23, 2022

(54) GENERATING TIME-BASED PREDICTIONS AND CONTROLLING ACCESS TO THE SAME

(71) Applicant: Optum Services (Ireland) Limited, Dublin (IE)

(72) Inventors: Vicente Rubén Del Pino Ruiz, Dublin (IE); Hendrik Kleine, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 17/235,493

(22) Filed: Apr. 20, 2021

(51) Int. Cl.
  *G07C 9/22* (2020.01)
  *G07C 9/28* (2020.01)
  *G06N 20/00* (2019.01)
  *G07C 9/00* (2020.01)

(52) U.S. Cl.
  CPC ............ *G07C 9/22* (2020.01); *G06N 20/00* (2019.01); *G07C 9/00904* (2013.01); *G07C 9/28* (2020.01); *G07C 2209/08* (2013.01)

(58) Field of Classification Search
  CPC ........ G07C 9/22; G07C 9/00904; G07C 9/28; G07C 2209/08; G06N 20/00
  See application file for complete search history.

(56) References Cited

U.S. PATENT DOCUMENTS

| 8,583,079 | B2 * | 11/2013 | Chawla | H04L 51/04 455/410 |
| 9,710,757 | B2 | 7/2017 | Gilon et al. | |
| 10,181,052 | B2 * | 1/2019 | Li | G06Q 10/06 |
| 10,972,471 | B2 * | 4/2021 | Connell, II | H04L 63/0876 |
| 2011/0183645 | A1 * | 7/2011 | Chawla | H04M 3/42357 455/410 |
| 2012/0065987 | A1 | 3/2012 | Farooq et al. | |

(Continued)

FOREIGN PATENT DOCUMENTS

| JP | 2019161303 A | * | 9/2019 | |
| WO | 2010/052638 A1 | | 5/2010 | |
| WO | WO-2015094304 A1 | * | 6/2015 | ......... G06F 21/6263 |

OTHER PUBLICATIONS

Potthoff, Sandra et al. "Improving Hospital Discharge Planning for Elderly Patients," Health Care Financing Review, vol. 19, No. 2, (Winter 1997), pp. 47-72. PMID: 10345406; PMCID: PMC4194477.

*Primary Examiner* — Ojiako K Nwugo
(74) *Attorney, Agent, or Firm* — Alston & Bird LLP

(57) ABSTRACT

There is a need to accurately and dynamically generate a time-based prediction and control access to the time-based prediction. This need can be addressed, for example, by allowing controlled access to user information pertaining to a user visiting a facility. In one example, a method includes storing a companion user identifier in association with a public user identifier; receiving a request for a user status of the user; determining whether the companion user is permitted to receive the user status of the user based at least in part on the public user identifier and the companion user identifier; responsive to determining that the companion user is permitted to receive the user status of the user, requesting an aggregated time-based prediction for the user; and causing the aggregated time-based prediction to be decrypted and provided as a response to the request for the user status of the user.

20 Claims, 9 Drawing Sheets

(56) References Cited

U.S. PATENT DOCUMENTS

| | | | |
|---|---|---|---|
| 2014/0228062 A1* | 8/2014 | Rubowitz | H04W 52/0277 |
| | | | 455/466 |
| 2015/0120633 A1 | 4/2015 | Norlander et al. | |
| 2015/0242582 A1 | 8/2015 | Mehta et al. | |
| 2015/0356249 A1 | 12/2015 | Wright et al. | |
| 2016/0094938 A1* | 3/2016 | Upadhyaya | H04W 4/029 |
| | | | 455/456.3 |
| 2016/0180029 A1 | 6/2016 | Shanbhag | |
| 2016/0275458 A1* | 9/2016 | Meushar | G06Q 10/109 |
| 2016/0309310 A1* | 10/2016 | Herman | H04W 68/005 |
| 2017/0034348 A1* | 2/2017 | Chau | H04L 67/24 |
| 2017/0255750 A1 | 9/2017 | Geleijnse et al. | |
| 2018/0191647 A1* | 7/2018 | Thapliyal | H04L 67/24 |
| 2019/0034591 A1 | 1/2019 | Mossin et al. | |
| 2019/0075207 A1* | 3/2019 | Kitaguchi | H04N 1/00079 |
| 2020/0005928 A1 | 1/2020 | Daniel | |
| 2020/0272919 A1 | 8/2020 | Haimson et al. | |
| 2021/0005321 A1 | 1/2021 | Hwang | |

* cited by examiner

GENERATING TIME-BASED PREDICTIONS AND CONTROLLING ACCESS TO THE SAME

BACKGROUND

Various embodiments of the present invention address technical challenges related to accurately and dynamically generating a time-based prediction and controlling access to the time-based prediction.

BRIEF SUMMARY

In general, embodiments of the present invention provide methods, apparatuses, systems, computing devices, computing entities, and/or the like for accurately and dynamically generating a time-based prediction and controlling access to the time-based prediction.

In accordance with one aspect, a method includes: storing, by one or more processors, a companion user identifier in association with a public user identifier, wherein (a) the public user identifier corresponds to a user, (b) the public user identifier maps to a private user identifier that corresponds to the user, (c) the companion user identifier corresponds to a companion user, and (d) the companion user identifier is configured to provide the companion user with access to a time-based prediction associated with the user; receiving, by the one or more processors, a request for a user status of the user, wherein the request for the user status of the user originates from a computing entity of the companion user; responsive to authenticating the companion user based at least in part one access credentials of the companion user, determining, by the one or more processors, whether the companion user is permitted to receive the user status of the user based at least in part on the public user identifier and the companion user identifier; responsive to determining that the companion user is permitted to receive the user status of the user, requesting, by the one or more processors, an aggregated time-based prediction for the user, wherein the aggregated time-based prediction (a) is generated by one or more aggregated data machine learning models based at least in part on a facility time-based prediction and a public time-based prediction, (b) the facility time-based prediction is generated by one or more facility data machine learning models, (c) the public time-based prediction is generated by one or more public data machine learning models, and (d) the aggregated time-based prediction is indicative of a visit duration of the user; and causing, by the one or more processors, the aggregated time-based prediction to be decrypted and provided as a response to the request for the user status of the user.

In accordance with another aspect, an apparatus comprising at least one processor and at least one memory including program code, the at least one memory and the program code configured to, with the processor, cause the apparatus to at least: store a companion user identifier in association with a public user identifier, wherein (a) the public user identifier corresponds to a user, (b) the public user identifier maps to a private user identifier that corresponds to the user, (c) the companion user identifier corresponds to a companion user, and (d) the companion user identifier is configured to provide the companion user with access to a time-based prediction associated with the user; receive a request for a user status of the user, wherein the request for the user status of the user originates from a computing entity of the companion user; responsive to authenticating the companion user based at least in part one access credentials of the companion user, determine whether the companion user is permitted to receive the user status of the user based at least in part on the public user identifier and the companion user identifier; responsive to determining that the companion user is permitted to receive the user status of the user, request an aggregated time-based prediction for the user, wherein the aggregated time-based prediction (a) is generated by one or more aggregated data machine learning models based at least in part on a facility time-based prediction and a public time-based prediction, (b) the facility time-based prediction is generated by one or more facility data machine learning models, (c) the public time-based prediction is generated by one or more public data machine learning models, and (d) the aggregated time-based prediction is indicative of a visit duration of the user; and cause the aggregated time-based prediction to be decrypted and provided as a response to the request for the user status of the user.

In accordance with yet another aspect, a computer program product computer program comprising at least one non-transitory computer-readable storage medium having computer-readable program code portions stored therein, the computer-readable program code portions configured to: store a companion user identifier in association with a public user identifier, wherein (a) the public user identifier corresponds to a user, (b) the public user identifier maps to a private user identifier that corresponds to the user, (c) the companion user identifier corresponds to a companion user, and (d) the companion user identifier is configured to provide the companion user with access to a time-based prediction associated with the user; receive a request for a user status of the user, wherein the request for the user status of the user originates from a computing entity of the companion user; responsive to authenticating the companion user based at least in part one access credentials of the companion user, determine whether the companion user is permitted to receive the user status of the user based at least in part on the public user identifier and the companion user identifier; responsive to determining that the companion user is permitted to receive the user status of the user, request an aggregated time-based prediction for the user, wherein the aggregated time-based prediction (a) is generated by one or more aggregated data machine learning models based at least in part on a facility time-based prediction and a public time-based prediction, (b) the facility time-based prediction is generated by one or more facility data machine learning models, (c) the public time-based prediction is generated by one or more public data machine learning models, and (d) the aggregated time-based prediction is indicative of a visit duration of the user; and cause the aggregated time-based prediction to be decrypted and provided as a response to the request for the user status of the user.

BRIEF DESCRIPTION OF THE DRAWINGS

Figure 1:
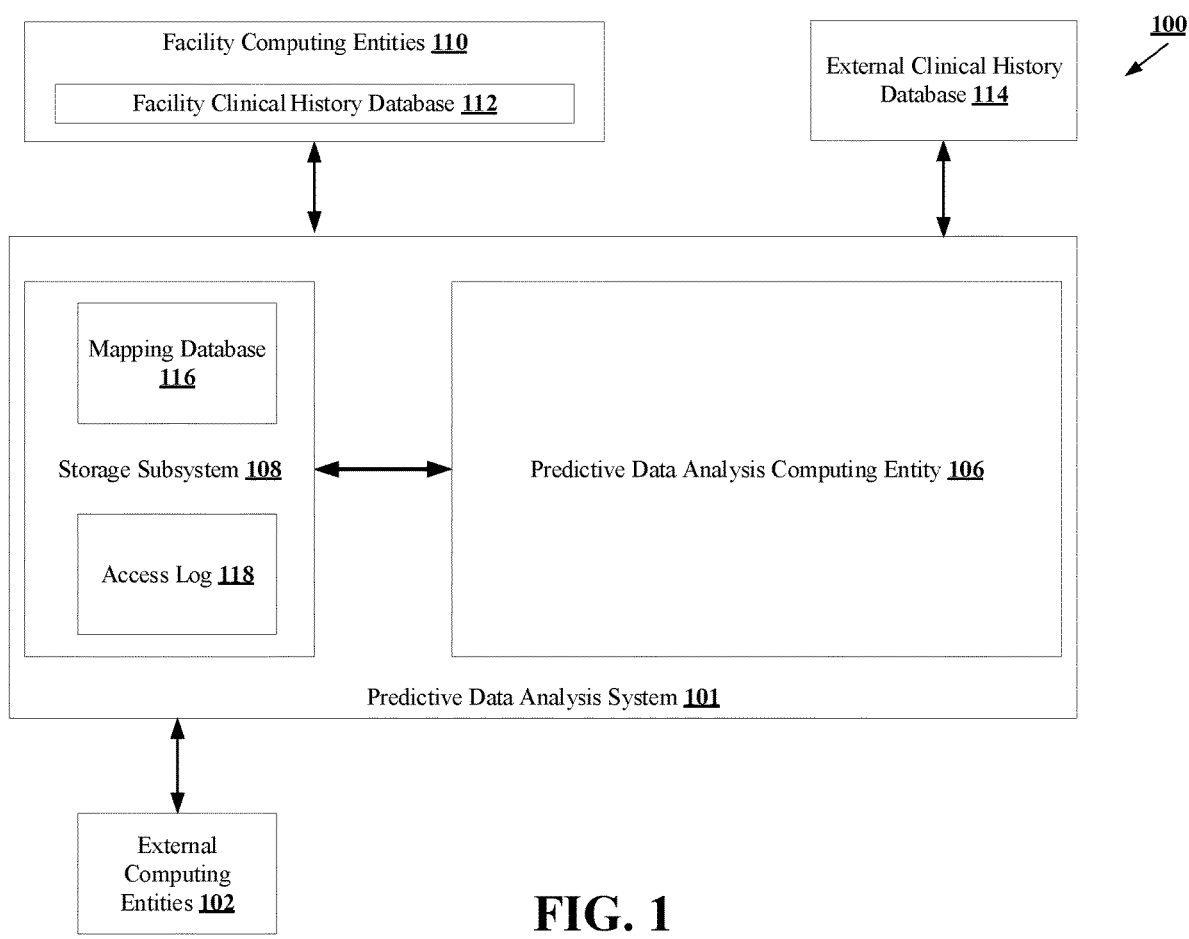
Figure 2:
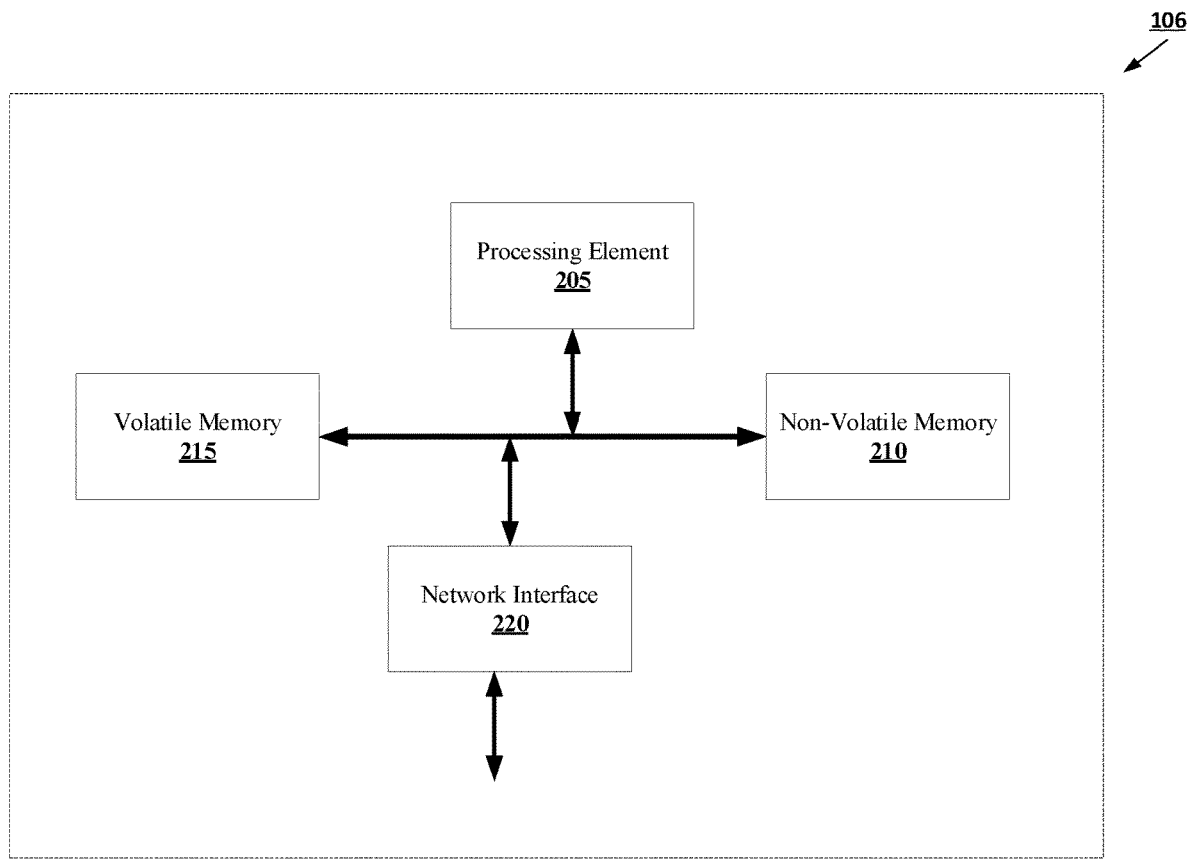
Figure 3:
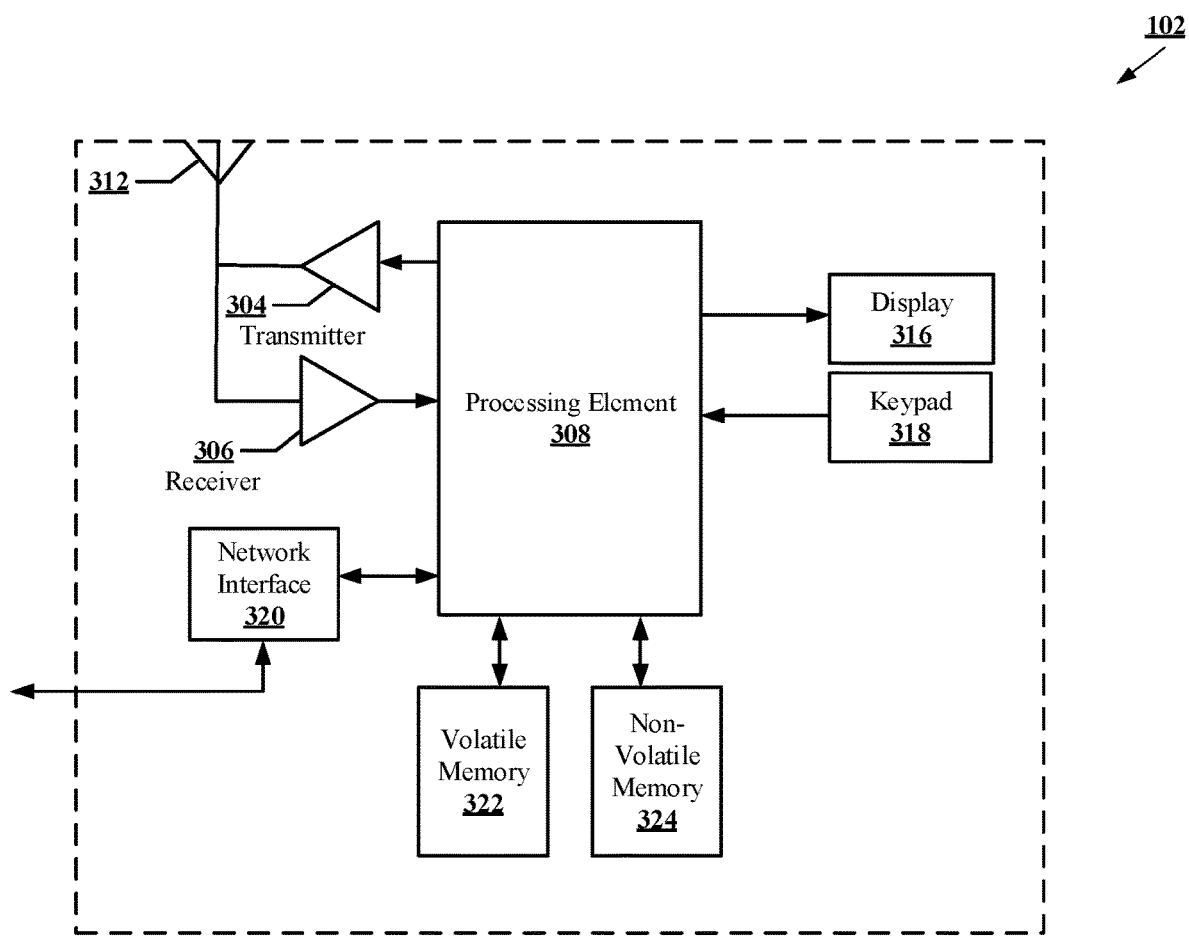
Figure 8:
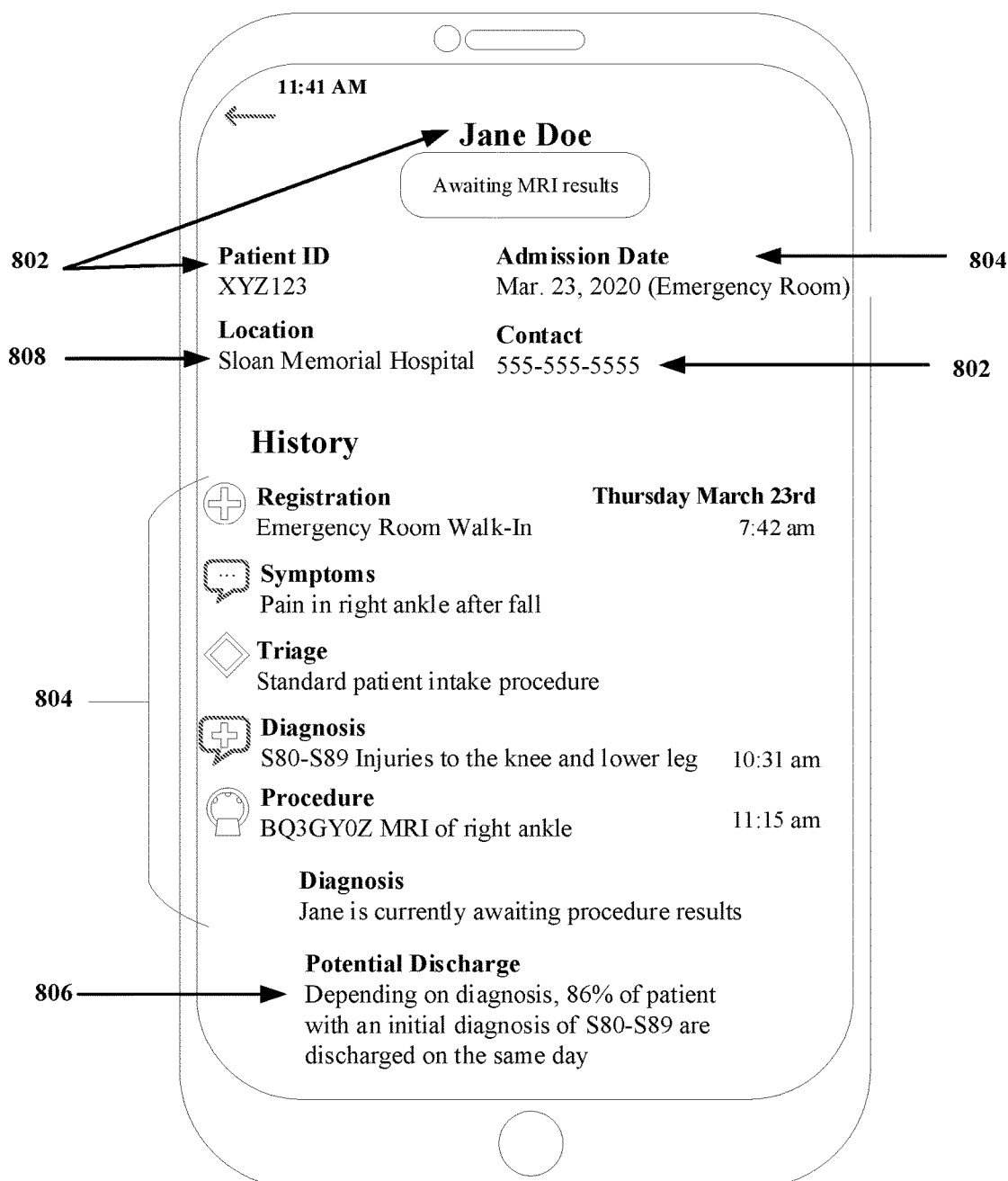
Figure 9:
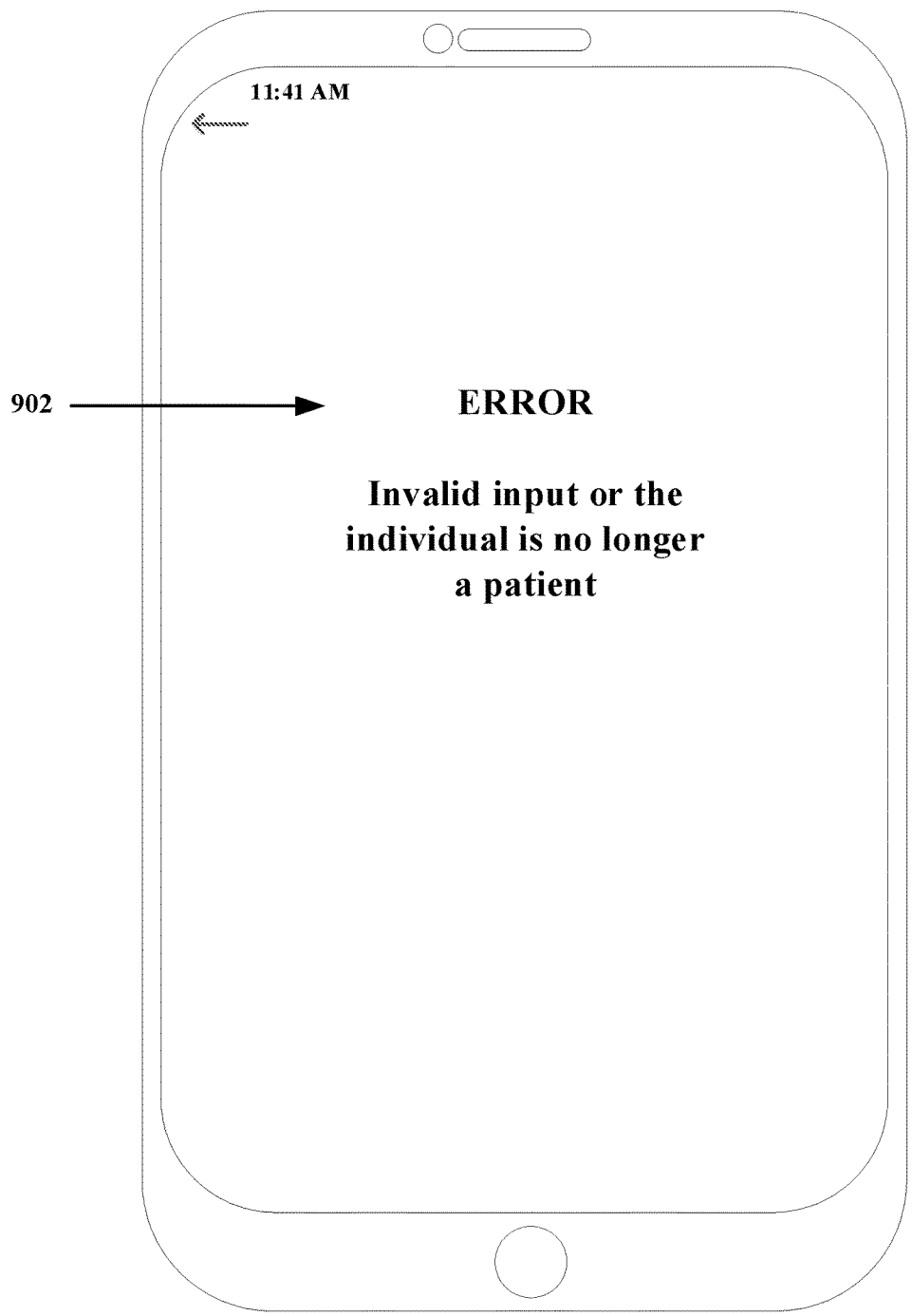

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIGS. 4, 5, 6, and 7 provide flowchart diagrams in accordance with some embodiments discussed herein;

FIGS. 8-9 provide operational examples of prediction output user interfaces in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL ADVANTAGES

Various embodiments of the present invention address technical challenges related to accurately and dynamically generating a time-based prediction and controlling access to the time-based prediction. In an example in which a user is admitted to a healthcare facility, an associated companion may be unable to accompany the user inside the healthcare facility. As such, the companion may be deprived of a number of important events, such as the user's symptoms, diagnosis, admission status, scheduled procedures, required personal items, visiting options, and predicted discharge information (e.g., time-based prediction). Standard software methods are ineffective for communicating such user events to the user's companion, and conventional methods, such as the user communicating directly with his/her companion, are not always feasible or possible. In some instances, it may be important that the companion be informed of such events.

To address the above-noted technical challenges associated with accurately and dynamically generating a time-based prediction and controlling access to the time-based prediction, various embodiments of the present invention describe controlling access to associated user data. More specifically, an associated companion of the user may be provided access to user data such that the companion may be able to access, for example, a time-based prediction for the user and/or other user data. Access to such user data may be controlled through generation of a public user identifier, companion user identifier, and associated access credentials, that may be provided by a user, such as a companion, to authorize an access to a user's status. The user data may be stored and maintained in encrypted manner until a request for a user status (e.g., visit status, time-based prediction, and/or the like) is received and authenticated based at least in part on provided public user identifier, companion user identifier, and associated access credentials. Once successfully authenticated, user data may be decrypted and provided to an authorized user for a predetermined time period. As such, a user's privacy is maintained while also allowing an authorized user, such as a companion, to be informed of the status of an associated user.

In various embodiments, one or more aggregated data machine learning models are configured to generate an aggregated time data object for a user. The aggregated time data object may be generated in real-time or near real-time such that the aggregated time data object for a user reflects the most up-to-date time-based prediction for the user. The one or more aggregated data machine learning models may receive input from a facility data machine learning model and/or a public data machine learning model configured to generate a facility time data object and public time data object, respectively, each describing a predicted duration of user visit, a predicted departing time for the user to leave the facility, a predicted departing date for the user to leave the facility, and/or one or more predicted next events for the user visiting the facility based at least in part on the feature data object (e.g., comprising one or more data fields or features) described by the one or more visit data objects associated with the user. Using these inputs, the one or more aggregated data machine learning models may, in some embodiments, be able to generate an aggregated time data object for the user indicative of a real-time, up-to-date time-based prediction for the user. The aggregated time data object may describe a predicted duration of user visit to a facility based at least in part on the facility time data object and public time data object. In some embodiments, the aggregated time data object may also describe a predicted departing time for the user to leave the facility, a predicted departing date for the user to leave the facility, and/or one or more predicted next events for the user currently visiting the facility based at least in part on the facility time data object and public time data object.

Importantly, the use of separate machine learning models to generate different outputs allows for a modulated time-based prediction system. That is, by using more than one model, these multiple models produce various outputs that may be generated simultaneously. This allows the system to reflect the most up-to-date aggregated time data object for an associated user in real-time based at least in part on both facility-based data and non-facility-based data. In this way, the one or more aggregated data machine learning models are capable of generating an accurate aggregated time-based prediction for a user visiting a facility. Additionally, the use of both a facility data machine learning model and/or a public data machine learning model allows for a more customized aggregated time data object for the user that is based at least in part on both public datasets and facility-specific datasets. Additionally, the noted various modularized system may accomplish these objectives while reducing the computational complexity of the runtime operations that need to be performed by using multiple models to generate such outputs. This results in a more time efficient and less computationally resource-intensive method to generate an up-to-date aggregated time data object for a user.

II. DEFINITIONS OF CERTAIN TERMS

The term "feature data object" may refer to an electronically-stored data construct that is configured to describe data describing features/events of a user and/or data describing features of the facility the user is visiting. As will be recognized, a feature data object may be represented as one or more vectors, embeddings, datasets, and/or the like. In some embodiments, the feature data object may comprise one or more numerical data fields, one or more categorical data fields, one or more static data fields, and/or the like. In some embodiments, the feature data object may describe user identifying information, such as a user's first name, last name, full name, date of birth, mailing address, phone number, email address, and associated user data, such as medical records, events, scheduled tests, test results, diagnoses, and/or the like. In some embodiments, the one or more feature data objects may describe facility information, such as facility name, associated visit area, geographic location, facility, CMS certification number (CCN), national provider identifier (NPI), facility type, control type, teaching status, bed size, and/or the like. In some embodiments, the feature data object describes a visit type. In some embodiments, the visit type may comprise one or more International Statistical Classification of Diseases (ICD) codes, current procedural terminology (CPT) codes, or healthcare common procedure coding system (HCPCS) codes indicative of a user's visit reason, procedures, and/or diagnosis. In some embodiments the data described by the feature data object may be collected by one or more facility computing entities. For example, in some embodiments, the facility the user is visiting may be a healthcare facility and the one or more facility computing entities may comprise one or more medical devices and/or machines, configured to collect user data. In some embodiments, the feature data object may be generated by a predictive data analysis computing entity based at least in part on one or more visit data objects.

The term "training feature data object" may refer to an electronically-stored data construct that is configured to describe a feature data object that is associated with a ground-truth facility time-based prediction (e.g., a ground-truth facility time-based prediction that describes an average duration of visit for a user at a facility). As will be recognized, a training feature data object may be represented as one or more vectors, embeddings, datasets, and/or the like. In some embodiments, the training feature data object may comprise one or more numerical data fields, one or more categorical data fields, one or more static data fields, and/or the like. The input data corresponding to the one or more training feature data objects may describe user identifying information, such as a user's first name, last name, full name, date of birth, mailing address, phone number, email address, and associated user data, such as medical records, events, scheduled tests, test results, diagnoses, and/or the like. In some embodiments, the input data may describe facility information, such as a facility name, associated visit area, geographic location, facility, CMS certification number (CCN), national provider identifier (NPI), facility type, control type, teaching status, bed size, and/or the like. In some embodiments, input data describes a visit type. In some embodiments, the visit type may comprise one or more International Statistical Classification of Diseases (ICD) codes, current procedural terminology (CPT) codes, or healthcare common procedure coding system (HCPCS) codes indicative of a user's visit reason, procedures, and/or diagnosis. In some embodiments, each ground-truth facility time data object may describe a ground-truth duration of visit for a user at a facility. The ground-truth duration of visit for a user may be indicative of the overall duration the user visited a facility. In some embodiments, the training feature data object may be used by predictive data analysis computing entity 106 to train one or more facility data machine learning models and/or one or more public data machine learning models.

The term "private user identifier" may refer to an electronically managed data construct that specifies a particular user in a facility. For example, a private user identifier may be any data construct that may be used to uniquely identify the associated user. For example, a private user identifier may include a username, email address, social security number (SSN), globally unique identifier (GUID), universally unique identifier (UUID), and/or the like. In some embodiments, the private user identifier may specify a particular patient within a healthcare facility and may be used internally by the healthcare facility. In some embodiments, the private user identifier may be associated with user data such as a user's medical records, events, scheduled tests, test results, diagnoses, and/or the like. In some embodiments, the private user identifier may be associated with user identifying information, such as a user's first name, last name, full name, date of birth, mailing address, phone number, email address, and/or the like.

The term "public user identifier" may refer to an electronically managed data construct that specifies a particular user visiting a facility. In some embodiments, the public user identifier may specify a user within a healthcare facility. The public user identifier may be mapped to a private user identifier used internally by a facility, such as, for example, a healthcare facility. As such, user data, such as medical information, events, user identifying information, and/or the like, which are linked to a private user identifier are also linked to the public user identifier via the mapping. In some embodiments, a predictive data analysis system 101 may receive a request for a public user identifier associated with a private user identifier and one or more corresponding user identification indicators, such as, a user's first name, last name, full name, date of birth, mailing address, phone number, or email address. The received user identification indicators may be used at least in part to confirm a user identity for the public user identifier request. For example, a public user identifier request may be associated with a private user identifier XYZ123 and the user identification indicator indicating a user's last name of Doe. A predictive data analysis system 101 may compare the received user identification indicator indicative of a user's last name of Doe to the user identifying information associated with the private user identifier to confirm that the user indicated by the private user identifier has a corresponding last name of Doe. The generated public user identifier along with associated access credentials may then be generated and mapped to the associated private user identifier. In some embodiments, the public user identifier and associated access credentials may be transmitted to a facility healthcare computing entity and/or one or more external computing entities, such as a user or companion mobile device. In some embodiments, in an instance in which the user described by the private user identifier is a returning user to the facility, such as a returning patient to a healthcare facility, an associated clinical history for the user may be accessed and associated with the public user identifier.

The term "companion user identifier" may refer to an electronically managed data construct that specifies a particular user associated with a user described by the public user identifier. In some embodiments, the companion user identifier may be associated with a particular public user identifier, such as by storing them in the mapping for the associated public user identifier, such that the companion user identifier is authorized to access certain user information pertaining to the user corresponding to the public user identifier in instances the companion user identifier, public user identifier, and associated access credentials are provided. In some embodiments, a predictive data analysis system 101 may receive a request for one or more companion user identifiers. In some embodiments, the request for one or more companion user identifiers may comprise at least one associated user indicator, such as a public user identifier, private user identifier, user first name, user last name, user full name, user date of birth, user mailing address, user phone number, user email address, and/or the like, and at least one associated companion indicator, such as companion first name, companion last name, companion full name, a phone number, or email address. The predictive data analysis system 101 may generate a companion user identifier for each of the one or more requested companion user identifiers and determine an access type for each companion user identifier. In some embodiments, the access type for each companion is indicative of the user information available to specific companion user identifier. For example, the access types may include, but are not limited to no access, restricted, somewhat restricted, or unrestricted. For an access type of no access, the companion user identifier is not authorized to access any information associated with a user described by a public user identifier, and therefore, is not provided any user information. For an access type of restricted, the companion user identifier may only access a time-based prediction associated with the user described by a public user identifier. A somewhat restricted access type may provide controlled access to a time-based prediction and additional access to current facility visit data, but not historical data associated with the user described by a public user identifier. An unrestricted access type may be provided access to a time-based prediction, current visit data, and historical visit data associated with the user described by a public user identifier. In some embodiments, the one or more generated companion user identifiers may be transmitted to a facility healthcare computing entity and/or one or more external computing entities, such as a user or companion computing device.

The term "visit data object" may refer to an electronically managed data construct that describes information pertaining to a user visiting a facility and/or information pertaining to a facility. In some embodiments, the visit data object may comprise one or more feature data objects describing user identifying information, such as a user's first name, last name, full name, date of birth, mailing address, phone number, email address, and associated user data, such as medical records, events, scheduled tests, test results, diagnoses, and/or the like. In some embodiments, the visit data object may also comprise one or more feature data objects describing facility information, such as facility name, associated visit area, geographic location, facility, CMS certification number (CCN), national provider identifier (NPI), facility type, control type, teaching status, bed size, and/or the like. In some embodiments, the visit data object describes a visit type. In some embodiments, the visit type may comprise one or more International Statistical Classification of Diseases (ICD) codes, current procedural terminology (CPT) codes, or healthcare common procedure coding system (HCPCS) codes indicative of a user's visit reason, procedures, and/or diagnosis. In some embodiments, a predictive data analysis system 101 may generate a visit data object for a user described by a public user identifier during the request for a public user identifier. For example, the predictive data analysis system 101 may request or receive, for example, new user data, such as one or more new events, scheduled tests, test results, diagnoses, and/or the like. In some embodiments, the visit data object may receive and store an aggregated time data object as generated by one or more aggregated data machine learning models. In some embodiments, the visit data object may also receive and store a facility time data object and public time data object as generated by the facility data machine learning model and public data machine learning model, respectively. The visit data object may further describe a feature data object describing a time-based prediction for a user visiting a facility based at least in part on the aggregated time data object. In some embodiments, a visit data object is associated with a public user identifier. In some embodiments, the visit data object may be associated with a unique visit data object identification identifier such that each visit data object is uniquely identifiable.

The term "user status" may refer to an electronically received data construct that describes the status of the user with respect to a facility. In some embodiments, the user status may indicate whether the user is currently visiting the facility. In some embodiments, the user status may further indicate a time the user left the facility. In some embodiments, the user status describes whether a patient is currently admitted to or discharged from a healthcare facility.

The term "facility data machine learning model" may refer to an electronically-stored data construct configured to describe parameters, hyper-parameters, and/or stored operations of one or more machine learning models configured to process one or more feature data objects described by one or more visit data objects pertaining to a user in a facility to generate a facility time data object. In some embodiments, the facility data machine learning model may be one or more trained machine learning models, such as regression models, neural network models, deep learning models, and/or the like, configured to process one or more feature data objects described by one or more visit data objects associated with the user corresponding to the public user identifier in order to generate the facility time data object. A facility time data object may describe a predicted duration of user visit to a facility based at least in part on the one or more feature data objects described by the one or more visit data objects associated with the user. In some embodiments, the facility time data object (e.g., facility time-based prediction) may also describe a predicted departing time for the user to leave the facility, a predicted departing date for the user to leave the facility, and/or one or more predicted next events for the user in the facility. In some embodiments, the facility data machine learning model is trained using a plurality of facility data objects from a facility clinical history database such that the facility data machine learning model is trained using data specific to the particular facility, such as a healthcare facility. In some embodiments, the training data may be specific to a particular specialty area in the facility, the facility as a whole, or incorporate data from other facilities within the same a chain of facilities. In some embodiments, the parameters and/or hyper-parameters of a facility data machine learning model may be represented as a two-dimensional array, such as a matrix.

The term "public data machine learning model" may refer to an electronically-stored data construct configured to describe parameters, hyper-parameters, and/or stored operations of one or more machine learning models configured to process one or more feature data objects described by one or more visit data objects pertaining to a user in a facility to generate a public time data object. In some embodiments, the public data machine learning model may be one or more trained machine learning models, such as regression models, neural network models, deep learning models, and/or the like, configured to process one or more feature data objects described by one or more visit data objects associated with the user corresponding to the public user identifier in order to generate the public time data object. A public time data object may describe a predicted duration of user visit based at least in part on the one or more feature data objects described by the one or more visit data objects associated with the user. In some embodiments, the public time data object (e.g., public time-based prediction) may also describe a predicted departing time for the user to leave the facility, a predicted departing date for the user to leave the facility, and/or one or more predicted next events for the user visiting the facility. In some embodiments, the public data machine learning model is trained using a plurality of public data objects from an external clinical history database such that the public data machine learning model is trained using data from a plurality of facilities. In some embodiments, the parameters and/or hyper-parameters of a public data machine learning model may be represented as a two-dimensional array, such as a matrix.

The term "aggregated data machine learning model" may refer to an electronically-stored data construct configured to describe parameters, hyper-parameters, and/or stored operations of one or more machine learning models configured to process at least one or more feature data objects described by a facility time data object and a feature data object (e.g., comprising one or more data fields or features) described by a public time data object in order to generate an aggregated time data object for a user. In some embodiments, the respective weighting coefficients may be configured by a facility user, such as an administrator. In some embodiments, the facility time data object and public time data object may each be associated with a weighting coefficient indicative of the respective weight given to each score. In some embodiments, the respective weighting coefficients may be determined dynamically by the aggregated data machine learning model. The aggregated time data object may describe a predicted duration of user visit to the facility. In some embodiments, the aggregated time data object may also describe a predicted departing time for the user to leave the facility and a predicted depart date for the user to leave the facility based at least in part on the facility time data object and the public time data object. The parameters and/or hyper-parameters of an aggregated data machine learning model may be represented as a two-dimensional array, such as a matrix.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

FIG. 1 is a schematic diagram of an example system architecture 100 for performing predictive data analysis operations and for performing one or more prediction-based actions (e.g., generating corresponding user interface data). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102, one or more facility computing entities 110, and an external clinical history database 114 using one or more communication networks. Examples of communication networks include any wired or wireless communication network including, for example, a wired or wireless local area network (LAN), personal area network (PAN), metropolitan area network (MAN), wide area network (WAN), and/or the like, as well as any hardware, software and/or firmware required to implement it (such as, e.g., network routers, and/or the like). An example of a prediction that may be generated by using the system architecture 100 is to a generate an aggregated time data object associated with a user described by a public user identifier.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to receive requests and/or data from external computing entities 102, process the requests and/or data to generate predictive outputs (e.g., predictive data objects), and provide the predictive outputs to the external computing entities 102. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. In some embodiments, the storage subsystem 108 is configured to store a mapping database 116 and an access log 118. The mapping database 116 may be configured to store one or more mappings performed by the predictive data analysis computing entity 106 between a public user identifier and a private user identifier. An access log 118 may be configured to store one or more access attempts received by the predictive data analysis computing entity 106 from one or more external computing entities 102. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Similarly, the predictive data analysis computing entity 106 may be in communication with one or more facility computing entities 110. The predictive data analysis computing entity 106 may be configured to receive requests and/or data from facility computing entities 110, process the requests and/or data to generate predictive outputs (e.g., predictive data objects), and provide the predictive outputs to facility computing entities 110 and/or one or more external computing entities 102. The facility computing entities 110 may include a facility clinical history database 112 configured to store data pertaining to patients within the healthcare facility. The facility computing entity 110 may periodically update/provide raw input to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The predictive data analysis computing entity may have access to a facility clinical history database 112. The facility clinical history database 112 may be configured to store a plurality of visit data objects from specific facility or chain of facilities. In some embodiments, the facility clinical history database 112 may store one or more visit data objects from a healthcare facility, healthcare facility chain, particular specialty area of a facility, and/or the like. The one or more visit data objects may be indicative of a visit type, facility location, and duration of visit. In some embodiments, the data stored in the facility clinical history database 112 is encrypted. In some embodiments, the predictive data analysis computing entity 106 may be configured to train a prediction model based at least in part on one or more visit data objects stored in the facility clinical history database 112. The facility clinical history database 112 may include one or more storage units, such as multiple distributed storage units that are connected through a computer network. Each storage unit in the facility clinical history database 112 may store at least one of one or more data assets and/or one or more data about the computed properties of one or more data assets. Moreover, each storage unit in the facility clinical history database 112 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity may have access to an external clinical history database 114. The external clinical history database 114 may be configured to store a plurality of publicly available anonymized visit data objects from a plurality of facilities. In some embodiments, the external clinical history database 114 may store one or more visit data objects from a plurality of healthcare facilities. The one or more visit data objects may be indicative of a visit type, facility location, and duration of visit. In some embodiments, the predictive data analysis computing entity 106 may be configured to train a prediction model based at least in part on one or more visit data objects stored in the external clinical history database 114. The external clinical history database 114 may include one or more storage units, such as multiple distributed storage units that are connected through a computer network. Each storage unit in the external clinical history database 114 may store at least one of one or more data assets and/or one or more data about the computed properties of one or more data assets. Moreover, each storage unit in the external clinical history database 114 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more configurable and executable program algorithms stored within an onboard memory storage module, and/or accessible over a network. In various embodiments, the AI computing entity may be configured to retrieve and/or execute one or more of the configurable program algorithms upon the occurrence of a configurable trigger event.

V. EXEMPLARY SYSTEM OPERATIONS

In various scenarios, a user may visit a facility, but one or more of his/her associated companions may not be allowed to accompany him/her during his/her visit to the facility. For example, safety precautions, such as mandated social distancing protocols to prevent transmission of diseases, may impose a limit on the number of companions able to accompany the user during his/her visit. However, this may result in the one or more companions being deprived of important information and/or events related to the user with regard to his/her visit to the facility. In the healthcare context, companions of a user admitted to a healthcare facility may miss a number of user events, such as admission, user diagnoses, scheduled procedures, required personal items, visiting options, and discharge. Therefore, it may be beneficial to provide the one or more associated companions of the user with information indicative of one or more user events and/or other user information, such as a time-based prediction associated with the user.

At the same time, there is still a need to maintain user privacy as the one or more user events and/or user information may contain sensitive user information. Additionally or alternatively, the user may be willing to share some of this sensitive user information with certain companions, but not others. By way of continuing example, if a user is a patient in a healthcare facility, associated user events and information may contain sensitive health-related information pertaining to the user. The user may wish to share, for example, a predicted discharge time with an associated companion but may not want that companion to view other associated user information, such as his/her predicted diagnosis. Therefore, there is a need to offer user information to one or more associated companions in a controlled fashion.

To address the need for controlled access to user information, embodiments of the present invention allow for the user to opt-in to a system configured to provide controlled access to user information to select companions and additionally, control what information is available to the selected companions. In this way, the user controls what associated information is available to each companion he/she chooses. Various embodiments of the present invention provide a system that may generate an associated public user identifier and associated access credentials that are shareable to one or more select companions, as well as a companion user identifier with an associated access type for each selected companion. A companion may transmit a request for a user status (e.g., visit status, time-based prediction, and/or the like) by providing the public user identifier, associated access credentials, and companion user identifier tuple to the system 100, and in turn, the system 100 may authenticate the request and provide select user information based at least in part on the access type associated with the particular companion user identifier. Additionally, the system 100 may track access to user information using an access log that logs each access attempt, companion user identifier information, and the user information that was provided to the companion associated with the companion user identifier. After a configurable time period after the user has left the facility and the companions therefore no longer require access to information regarding the user, the system may prevent access to user information such that user's privacy is protected.

Generation of a Public User Identifier

Figure 4:
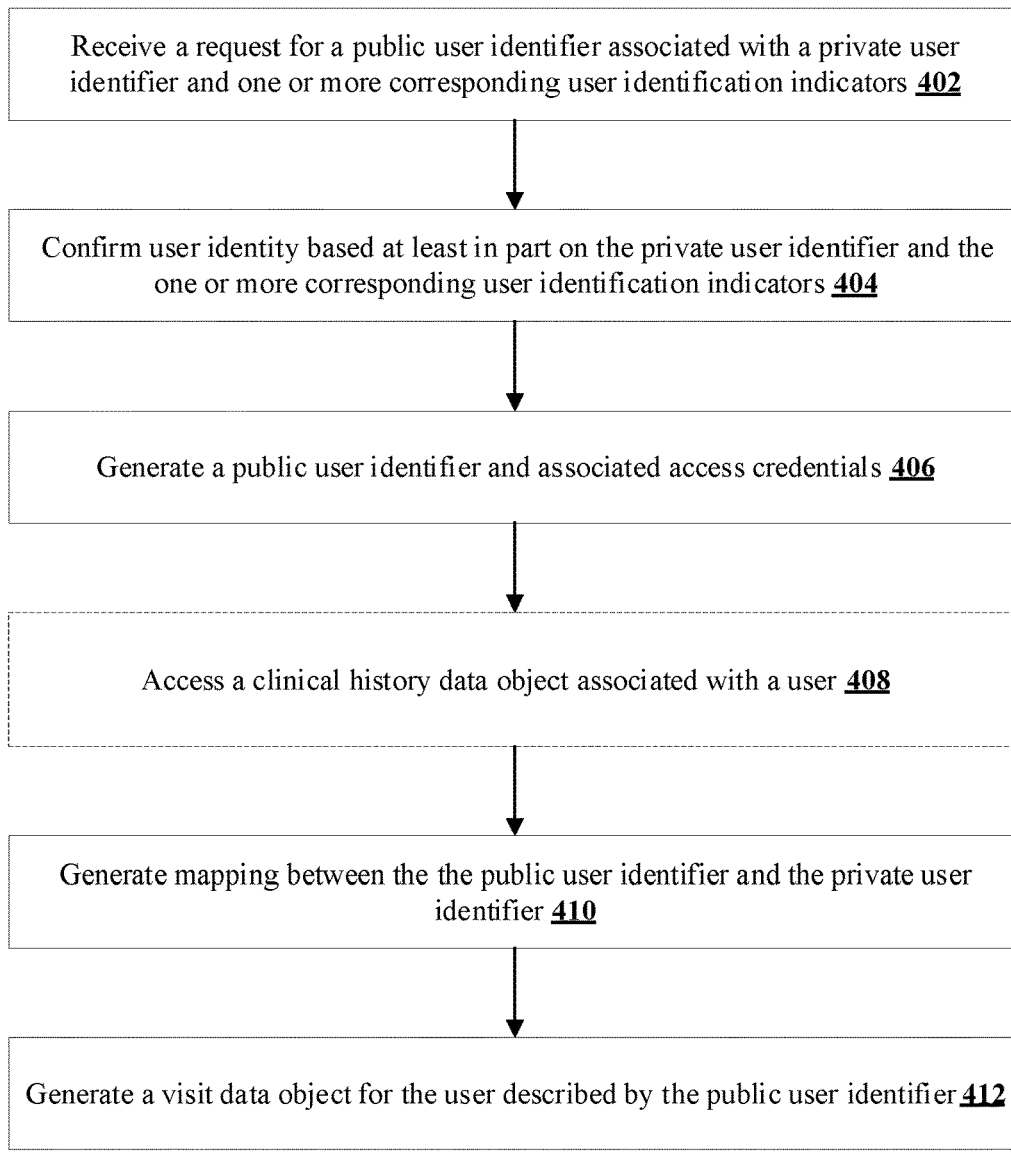

FIG. 4 is a flowchart diagram of an example process 400 for generating a public user identifier and associated access credentials for a user visiting a facility. Via the various steps/operations of the process 400, the predictive data analysis computing entity 106 can generate (or the user can select) a public user identifier and associated access credentials, which may be used in part by a user and/or one or more companions to access data from a visit data object associated with the user. The visit data object may comprise or be used to generate one or more feature data objects describing user information, such as user identifying information, such as a user's first name, last name, full name, date of birth, associated user data such as medical records, events, scheduled tests, test results, diagnoses, and associated facility information, such as the facility name and/or the like.

The process 400 begins at step/operation 402 when the predictive data analysis computing entity 106 receives a request for a public user identifier. In some embodiments, the predictive data analysis computing entity 106 receives this request from a facility computing entity 110. The request for a public user identifier may be associated with a private user identifier and one or more corresponding user identification indicators. A private user identifier is an electronically managed data construct that specifies a particular user within a facility and is used internally by the facility to uniquely identify the associated user. For example, a private user identifier may include a username, email address, SSN, GUID, UUID, and/or the like. The private user identifier may be associated with user data, such as a user's medical records, events, scheduled tests, test results, diagnoses as well as user identifying information, such as a user's first name, last name, full name, date of birth, mailing address, phone number, email address and/or the like. The one or more corresponding user identification indicators may comprise one or more data objects indicative of user identifying information, such as a user's first name, last name, full name, date of birth, mailing address, phone number, email address and/or the like.

In some embodiments, the predictive data analysis computing entity 106 receives a request for a public user identifier in response to a user request for a public user identifier. Due to the potential sensitive nature of the user information that will be provided to the one or more selected user companions, the user visiting the facility may be required to sign an electronic and/or paper consent form authorizing the system 100 to allow the one or more selected companions to access certain user information. In some embodiments, the user may be a patient in the hospital and the electronic and/or paper consent form which he/she must sign may be a HIPAA release form.

At step/operation 404, the predictive data analysis computing entity 106 confirms the user identity based at least in part on the private user identifier and the one or more corresponding user identification indicators. In some embodiments, the predictive data analysis computing entity 106 may check to ensure the user identifying information provided by the one or more associated user identification indicators matches the user identifying information corresponding to the private user identifier. For example, the one or more corresponding user identification indicators may be indicative of a user last name of Doe and the private user identifier may indicate an associated private user identifier XYZ123. The predictive data analysis computing entity 106 may confirm that the user last name corresponding to private user identifier XYZ123 also corresponds to a user last name of Doe. This information may be accessed from, for example, facility computing entities 110 or facility clinical history database 112. In this way, the predictive data analysis computing entity 106 incorporates a layer of security by confirming the identity of the user described in the request for a public user identifier.

In some embodiments, the one or more corresponding user identification indicators may comprise an electronic identifier unique to the user visiting the facility. In some embodiments, the one or more corresponding user identification indicators may comprise biometric data, such as face, fingerprint, hand, iris, DNA, keystroke, signature, and/or voice signals, which may be used to confirm user identity. In some embodiments, a two-factor authentication system may be utilized to confirm the user identity. In some embodiments, such user identification information may be stored in a facility computing entity 110, such as facility clinical history database 112, such that predictive data analysis computing entity may check a facility computing entity 110 to ensure the user identifying information provided by the one or more associated user identification indicators matches the user identifying information corresponding to the private user identifier. Additionally or alternatively, one or more external computing entities 102 may be used to confirm the user's identity.

At step/operation 406, the predictive data analysis computing entity 106 generates a public user identifier (or the user assigns) and associated access credentials. In some embodiments, the public user identifier is a different than the private user identifier. The predictive data analysis computing entity 106 may generate a public user identifier using any combination of alphabetical, numeric, and/or special characters. In some embodiments, the character length of the generated public user identifier may be a standardized character length such that all generated public user identifiers are of the same character length. In some embodiments, the character length of the generated public user identifier may be randomized such that two generated public user identifiers may comprise different character lengths. In some embodiments, a minimum character length may be required for security purposes. In some embodiments, the predictive data analysis computing entity 106 may then generate a public user identifier based at least in part on the one or more user identification indicators, such as a public user identifier of jdoe based at least in part on the associated user first name Jane and user last name Doe.

In some embodiments, a requested public user identifier may be received by the predictive data analysis computing entity 106 such that the public user identifier is provided by the user described in the request for a public user identifier. The predictive data analysis computing entity 106 may query the mapping database 116 and/or storage subsystem 108 to determine whether the public user identifier as provided by the user exists. If the public user identifier does not already exist, the predictive data analysis computing entity may generate the public user identifier as chosen by the user. In some embodiments, the predictive data analysis computing entity 106 may determine in the provided public user identifier satisfies a minimum character length may be required for security purposes. In an instance that the provided public user identifier does satisfy the minimum character length, for example, the predictive data analysis computing entity 106 may generate the public user identifier. In an instance, that the provided public user identifier does not satisfy the minimum character length, the predictive data analysis computing entity 106 may not generate the public user identifier. In some embodiments, the predictive data analysis computing entity 106 may generate and provide (e.g., transmit, send, etc.) a message to the requesting computing entity indicative that the public user identifier does not meet the minimum character length.

In an instance in which the public user identifier does already exist, the predictive data analysis computing entity 106 may determine if the existing public user identifier is associated with the user in the request for a public user identifier. The predictive data analysis computing entity 106 determines if the public user identifier provided by the user in the request for the public user identifier is associated with user by comparing the one or more corresponding user identification indicators as received by the request for a public user identifier with the one or more feature data objects described by the stored public user identifier. For example, the predictive data analysis computing entity 106 may compare the date of birth as described by the stored public user identifier and the date of birth described by the one or more corresponding user identification indicators. In the instance that the predictive data analysis computing entity 106 determines the existing public user identifier is associated with the user in the request for a public user identifier, the predictive data analysis computing entity 106 may associate the user with the existing public user identifier. In some embodiments, the predictive data analysis computing entity 106 may generate and provide (e.g., transmit, send, etc.) a request for previous associated access credentials to confirm the user's identity to the requesting computing entity. Additionally or alternatively, if associated access credentials are provided in the request for a public user identifier, the predictive data analysis computing entity 106 may use the provided associated access credentials to the confirm the user's identity. In the instance that the predictive data analysis computing entity 106 determines the existing public user identifier is not associated with the user in the request for a public user identifier, the predictive data analysis computing entity 106 may not associate the user with the existing public user identifier. In some embodiments, the predictive data analysis computing entity 106 may generate and provide (e.g., transmit, send, etc.) a message to the requesting computing entity indicative that the public user identifier is not available.

In some embodiments, the predictive data analysis computing entity 106 may receive associated access credentials in the request for a public user identifier. In some embodiments, the associated access credentials may be chosen by the user. In some embodiments, associated credentials are a string of characters used to confirm a user's identity. In some embodiments, the associated credentials may comprise multiple character strings. In some embodiments, the associated access credentials are associated with a set of one or more security questions. The associated access credentials may be a combination of alphabetical, numeric, and/or special characters. For security purposes, the associated access credentials may require a threshold number of characters, special characters, numeric characters, alphabetical characters, uppercase alphabetical characters, and/or the like. The predictive data analysis computing entity 106 may associate the access credentials with the corresponding public user identifier. In some embodiments, the associated access credentials may be stored with the public user identifier, such as within the storage subsystem 108 and/or the mapping database 116.

In some embodiments, the predictive data analysis computing entity 106 may generate the associated access credentials. The generation of the associated access credentials may occur simultaneous to, before, or after generation of a public user identifier. The predictive data analysis computing entity 106 may generate associated access credentials using any combination of alphanumeric characters and special characters. In some embodiments, the generated associated access credentials may follow the same character rules as described above. In some embodiments, the predictive data analysis computing entity 106 may generate associated access credentials based at least in part on the user identification indicators provided in the request for the public user identifier or associated with the private user identifier. For example, the predictive data analysis computing entity 106 may generate an associated credential of 01Doe19 for a user with the last name Doe and a birthday of Jan. 1, 1990. In some embodiments, the associated access credentials may be stored with the public user identifier, such as within the storage subsystem 108 and/or the mapping database 116.

Optionally, at step/operation 408, the predictive data analysis computing entity 106 accesses one or more clinical history data objects associated with a user identified by the private user identifier or one or more associated user identification indicators in an instance in which the user has previously visited the facility. In some embodiments, the user described in the request for a public user identifier may have previously visited the facility. In some embodiments, the user may be a patient who has visited a particular healthcare facility or the particular chain of healthcare facilities. In such an instance, the user described in the request for a public user identifier may have one or more associated clinical history data objects, for example, stored within the facility clinical history database 112. The one or more clinical history data objects may describe user identifying information, such as a user's first name, last name, full name, date of birth, mailing address, phone number, email address, and associated user data, such as medical records, events, scheduled tests, test results, diagnoses, and/or the like associated with a previous user visit to the facility. In some embodiments, the one or more clinical history data objects may also describe facility information, such as facility name, associated visit area, geographic location, facility, CMS CCN, NPI, facility type, control type, teaching status, bed size, and/or the like associated with the previous user visit to the facility. The one or more clinical history data objects may be accessed by the predictive data analysis computing entity 106 from the facility clinical history database 112 and associated with the public user identifier.

At step/operation 410, the predictive data analysis computing entity 106 may generate a mapping between the private user identifier and public user identifier. This mapping may be stored in a mapping database 116. The mapping between the private user identifier and public user identifier may describe the process of creating data element mappings to associate the public user identifier and the private user identifier and store the association in the mapping database 116. The predictive data analysis computing entity 106 may utilize this mapping to retrieve corresponding information associated with both the public user identifier and private user identifier using a single query comprising either the public user identifier or private user identifier. The mapping between the private user identifier and public user identifier may be used by the predictive data analysis computing entity 106 for a variety of reasons, such as, for example, to generate a visit data object for the user as will be discussed with reference to step/operation 412 or to request a user status (e.g., visit status, time-based prediction, and/or the like) as will be discussed with reference to FIG. 7. The mapping between the private user identifier and public user identifier allows the predictive data analysis computing entity 106 to receive a public user identifier and determine the corresponding private user identifier as used by a corresponding facility. Additionally or alternatively, the mapping between the private user identifier and public user identifier also allows the predictive data analysis computing entity 106 to receive a private user identifier and determine the corresponding public user identifier.

At step/operation 412, the predictive data analysis computing entity 106 may generate a visit data object for the user corresponding to the public user identifier. The visit data object for the user may describe user identifying information, such as a user's first name, last name, full name, date of birth, mailing address, phone number, email address. The visit data object may comprise or be used to generate one or more feature data objects describing user data, such as medical records, events, scheduled tests, test results, diagnoses, and/or the like. In some embodiments, the visit data object may also describe facility information, such as facility name, associated visit area, geographic location, facility, CMS CCN, NPI, facility type, control type, teaching status, bed size, and/or the like. In some embodiments, the visit data object may comprise one or more feature data objects describing a visit type. In some embodiments, the visit type may comprise one or more ICD codes, CPT, diagnosis codes, HCPCS codes, or other standardized codes indicative of a user's visit reason and/or diagnosis. In some embodiments, the visit data object may also comprise one or more feature data objects describing information as determined based at least in part on the information described by the clinical history data object as accessed in step/operation 408. For example, if a user visits an emergency room for right ankle pain after a fall, one or more feature data objects may be generated to indicate an ICD-10-CM code S80-S89 visit type, which is indicative of injuries to the knee and lower leg. As another example, if a user is a patient who visits an emergency room and presents with abdominal pain, the user may be admitted to the emergency room and one or more feature data objects may be generated to indicate an ICD-10-CM code R10, indicative of unspecified abdominal pain. While the user is admitted, the user may undergo one or more tests such that the user may be diagnosed with acute appendicitis. As such, a new visit data object may be generated and the one or more feature data objects may be updated to describe the one or more administered tests, results, and a visit type of ICD-10-CM code K35.80, indicative of unspecified acute appendicitis.

The predictive data analysis computing entity 106 may also generate a visit data object identification identifier associated with the particular visit data object such that the visit data object may be uniquely identified. In some embodiments, each visit data object may be stored in the storage subsystem 108 and/or mapping database 116. In some embodiments, the visit data object may be encrypted such that it may only be decrypted by an authorized user, such as a facility administrator, or by predictive data analysis computing entity 106 in the event predictive data analysis computing entity 106 successfully authenticates a user.

In some embodiments, the predictive data analysis computing entity 106 may also provide (e.g., send, transmit etc.) a response to the request for a public user identifier. The response to the request for a public user identifier may comprise at least the generated public user identifier. In some embodiments, the response may further comprise the associated access credentials. In some embodiments, the predictive data analysis computing entity 106 may provide a response to the request for a public user identifier by transmitting a notification to a facility computing entity 110.

In some embodiments, the request for a public user identifier may include a user identifier indicator indicative of a communication means for the user visiting the facility. For example, the user identification indicator may describe a phone number, email address, or other communication means to contact the user visiting the facility. In some embodiments, the user identification indicator may additionally include an indication of a preferred method of contact for the user, such as by voice call, text, or email. In some embodiments, the predictive data analysis computing entity 106 may provide a response to the request for a public user identifier by transmitting a notification to the user visiting the facility using the contact information provided by the user identification indicator. For example, the predictive data analysis computing entity 106 may transmit an SMS text, email notification, or auditory call notification informing the user of his/her generated public user identifier. The predictive data analysis computing entity 106 may also send a notification to the facility computing entity 110 indicating the request for a public user identifier has been completed.

Via the various step/operations associated with FIG. 4, the predictive data analysis computing entity 106 generated a public user identifier for a user in the received request for a public user identifier and mapped the public user identifier to a corresponding private user identifier, such that information from both the private user identifier and public user identifier may be obtained using a single query. The predictive data analysis computing entity 106 also generated a visit data object associated with the public user identifier with one or more feature data objects describing user identifying information, such as a user's first name, last name, full name, date of birth, mailing address, and associated user data, such as medical records, events, scheduled tests, test results, diagnoses, facility information, such as facility name, associated visit area, geographic location, facility, CMS CCN, NPI, facility type, control type, teaching status, bed size, a visit type, and/or the like.

Generation of a Companion User Identifier

Figure 5:
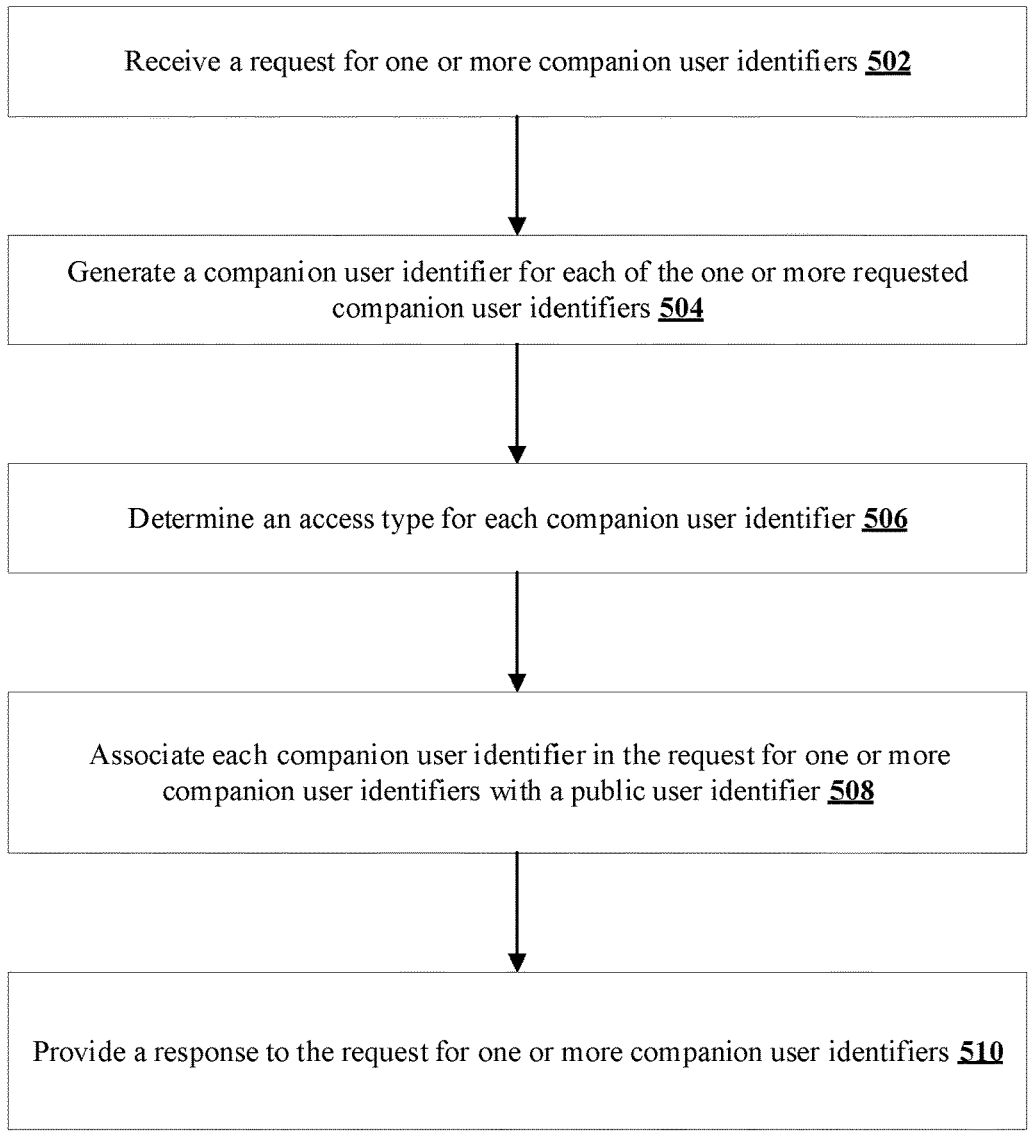

FIG. 5 is a flowchart diagram of an example process 500 for generating one or more companion user identifiers for one or more companions associated with a user in a facility. In some embodiments, the user in a facility may be a patient in a healthcare facility and the one or more companions associated with the user may be unable to accompany the user during their admission and stay in the healthcare facility. As such, the one or more companions may be unaware of a number of important events, such as the user's symptoms, diagnosis, admission status, scheduled procedures, required personal items, visiting options, and predicted discharge information (e.g., time-based prediction). Via the various steps/operations of the process 500, the predictive data analysis computing entity 106 can generate a companion user identifier for each companion in the request for one or more companion user identifiers, which may be used in part by a user and/or one or more companions to access a portion of a visit data object associated with a user in a facility. As such, the one or more companions associated with the user may be provided a portion of the user information described by the visit data object and thus, may be informed of important user events. In some embodiments, the process described in FIG. 5 and the process previously described in FIG. 4 may be performed simultaneously.

The process 500 begins at step/operation 502 when the predictive data analysis computing entity 106 receives a request for one or more companion user identifiers. In some embodiments, the predictive data analysis computing entity 106 receives this request from a facility computing entity 110. The request for one or more companion user identifiers may comprise at least one associated user indicator and at least one companion indicator. The at least one associated user indicator may describe information pertaining to the user associated with the companion such as a public user identifier, private user identifier, user's first name, last name, full name, date of birth, mailing address, phone number, email address and/or the like. The at least one associated companion indicator may describe information pertaining to a companion of the user such as a companion's first name, last name, or full name, phone number, and/or email address. For example, the associated user indicator may describe the user visiting the facility, such as a patient visiting a healthcare facility, and the at least one companion indicator may describe a companion associated with the user visiting the facility, such as a family member, friend, significant other, caretaker, etc.

The request for one or more companion user identifiers may comprise an access type for each companion user identifier in the request for one or more companion user identifiers. In some embodiments, the predictive data analysis computing entity 106 receives the request for one or more companion user identifiers in response to a request from a user visiting a facility. For example, a patient in a healthcare facility may request one or more associated companions are provided with access to the user information. In some embodiments, the user associated with the one or more companions in the request for one or more companion user identifiers may provide an indication of one or more companions he/she would like to be able to access user information. In some embodiments, a user may choose an access type from a list of access types. In some embodiments, the access types may include, but are not limited to no access, restricted, somewhat restricted, or unrestricted. For an access type of no access, the companion user identifier is not authorized to access any information associated with a user described by a public user identifier, and therefore, is not provided any user information. This may be used by a user if the user would like to prevent a previously associated companion from further accessing any user information. For an access type of restricted, the companion user identifier may only access a time-based prediction associated with the user described by a public user identifier. A somewhat restricted access type may provide controlled access to a time-based prediction and additional access to current facility visit data, but not historical data associated with the user described by a public user identifier. An unrestricted access type may be provided access to a time-based prediction, current visit data, and historical visit data associated with the user described by a public user identifier. In some embodiments, the user may specify a desired access type for each companion.

In some embodiments, the predictive data analysis computing entity 106 may present a consent data object for viewing by the user. The consent data object may describe each companion access type such that the user may select a specific access type for each companion and provide the request for one or more companion user identifiers. In some embodiments, the user may be a patient in the hospital and may be required to sign an electronic and/or paper consent form prior to providing the request for one or more companion user identifiers. In some embodiments, the form which he/she must sign may be a HIPAA release form, which may be the same release form or a different release form as the release form associated with the request for a public user identifier.

At step/operation 504, the predictive data analysis computing entity 106 generates a companion user identifier for each of the one or more companion user identifiers in the request for one or more companion user identifiers. The predictive data analysis computing entity 106 may generate a companion user identifier using any combination of alphabetical, numeric, and/or special characters. In some embodiments, the character length of the generated companion user identifier may be a standardized character length such that all generated companion user identifiers are of the same character length. In some embodiments, the character length of the generated companion user identifier may be randomized such that two generated companion user identifiers may comprise different character lengths. In some embodiments, a minimum character length for each companion user identifier may be required for security purposes. In some embodiments, the generated companion user identifier may comprise a portion of the companion information provided by the at least one associated companion indicator. For example, a request for one or more companion user identifiers may comprise a companion indicator describing a companion last name of Smith and a companion first name of John. The predictive data analysis computing entity 106 may then generate a companion user identifier based at least in part on the at least one companion indicator, such as a companion user identifier of jsmith based at least in part on the associated companion first name John and companion last name Smith.

In some embodiments, a requested companion user identifier may be provided in the request for one or more companion user identifiers. The requested companion user identifier may be chosen by the associated companion. The predictive data analysis computing entity 106 may query the storage subsystem 108 to determine whether the companion user identifier as provided by the companion exists. If the companion user identifier does not already exist, the predictive data analysis computing entity 106 may generate the companion user identifier as chosen by the companion. If the companion user identifier does already exist, the predictive data analysis computing entity 106 may determine if the existing companion user identifier is associated with the same user as described by the public user identifier as described in the request for one or more companion user identifiers. If the predictive data analysis computing entity 106 determines the existing companion user identifier and requested companion user identifier are both associated with the same public user identifier, the predictive data analysis computing entity 106 may associate the companion user identifier with the new public user identifier. In some embodiments, the predictive data analysis computing entity 106 may generate and provide (e.g., transmit, send, etc.) a message to the requesting computing entity indicative that the companion user identifier was successfully generated. If the predictive data analysis computing entity 106 determines the existing companion user identifier and requested companion user identifier are not associated with the same public user identifier, the predictive data analysis computing entity 106 may not associate the companion user identifier with the new public user identifier. In some embodiments, the predictive data analysis computing entity 106 may generate and provide (e.g., transmit, send, etc.) a message to the requesting computing entity indicative that the requested companion user identifier is unavailable.

In some embodiments, the predictive data analysis computing entity 106 may determine if the provided companion user identifier satisfies a minimum character length. In an instance that the provided companion user identifier does satisfy the minimum character length, the predictive data analysis computing entity 106 may generate the companion user identifier. In an instance, that the provided companion user identifier does not satisfy the minimum character length, the predictive data analysis computing entity 106 may not generate the companion user identifier. In some embodiments, the predictive data analysis computing entity 106 may generate and transmit a message to the requesting computing entity indicative that the companion user identifier does not meet the minimum character length.

At step/operation 506, the predictive data analysis computing entity 106 assigns an access type for each generated companion user identifier. In some embodiments, the user associated with the one or more companions from the request for one or more companion user identifiers may choose an access type such that it is provided in the request for one or more companion user identifiers. The access type for each companion may be specified individually for each companion user identifier or a single access type may be specified for all companion user identifiers in the request for one or more companion user identifiers. Regardless of whether the access type is specified for each companion individually or the one or more companions as a group, the predictive data analysis computing entity 106 may assign an access type for each companion user identifier. For example, a user who is a patient at healthcare facility may be comfortable with certain companions accessing more personal user data, such as historical medical records, but may prefer other companions do not have access to such records. The user may specify an access type for each companion such that they may allow certain companion to access medical records but may prevent other companions from accessing those same medical records.

In some embodiments, the access type may be defined at various levels such that the access type associated with each companion user identifier may be defined at various levels with regard to one or more associated user visit data objects. For example, the access type of the companion may be defined at the field level, such that the companion user identifier may have an access type for each data field described by one or more feature data objects and/or one or more visit data objects associated with a user. As another example, the access type of the companion user identifier may be defined at the record level, such that the companion may have an access type for one or more data fields associated with one or more feature data objects, such as a medical record, described by one or more visit data objects associated with a user. As yet another example, the access type of the companion user identifier may be defined at the visit level, such that the companion may have an access type for one or more data fields described by one or more feature data objects associated with the same facility visit described by one or more visit data objects associated with the user. Any other access type definitions may also be contemplated such that one or more data fields within a feature data object and/or visit data object associated with a user visiting a facility may be associated with an access type for the companion user identifier.

At step/operation 508, the predictive data analysis computing entity may associate each companion user identifier in the request for one or more companion user identifiers with a public user identifier (e.g., store them in the mapping for the public user identifier). The predictive data analysis computing entity 106 may associate each companion user identifier with the public user identifier by, for instance, storing each companion user identifier in the storage subsystem 108 and/or mapping database 116 with the corresponding public user identifier. Additionally, each companion user identifier may be stored with the determined access type such that predictive data analysis computing entity 106 may determine what user information associated with the user corresponding to the public user identifier to allow the companion user identifier to access. This allows the companion user identifier to be mapped to the public user identifier and further allows the public user identifier to be mapped to the private user identifier.

In some embodiments, the request for the public user identifier occurs simultaneously with the request for a public user identifier such that the predictive data analysis computing entity 106 has not yet generated the public user identifier at the time the request for one or more companion user identifiers is received. As such, the predictive data analysis computing entity 106 may use the at least one associated user indicator provided in the request for one or more companion user identifiers to determine the public user identifier of the associated user. For example, the associated user indicator may describe a private user identifier of XYZ123. The predictive data analysis computing entity 106 may then, for instance, query the mapping database 116 for the private user identifier of XYZ123 to determine the associated public user identifier. In some embodiments, the predictive data analysis computing entity 106 may receive the request for one or more companion user identifiers after generating a public user identifier. The request for one or more companion user identifiers may include at least one associated user indicator describing the public user identifier. For example, if a user decides to add an additional companion to an associated companion list at a later time, a new request for one or more companion user identifiers may be generated for the additional companion. The new request for one or more companion user identifiers may include an associated user indicator that describes the user's associated public user identifier.

At step/operation 510, the predictive data analysis computing entity 106 may provide a response to the request for one or more companion user identifiers. The response to the request for one or more companion user identifiers may comprise at least one or more generated companion user identifiers. In some embodiments, the predictive data analysis computing entity 106 may provide a response to the request for one or more companion user identifiers by transmitting a notification of the one or more generated companion user identifiers to a facility computing entity 110. In some embodiments, in the instance that a companion provided his/her companion user identifier and the predictive data analysis computing entity 106 successfully generated the companion user identifier, the response to the request for one or more companion user identifiers may be a confirmation that the provided companion user identifier was generated.

In some embodiments, the request for one or more companion user identifiers (e.g., jsmith) may include an associated companion indicator (e.g., an associated phone number 555-555-5555) that describes a communication means for the one or more companions (and/or serves as the companion user identifier). For example, the associated companion indicator associated with a companion may describe a phone number, email address, or other communication means to contact the companion. In some embodiments, the associated companion indicator may additionally include an indication of a preferred method of contact for the companion, such as by voice call, text, or email. In some embodiments, the predictive data analysis computing entity 106 may provide a response to the request for one or more companion user identifiers by providing (e.g., transmit, send, and/or the like) a notification to each companion using the contact information provided by the associated companion indicator. For example, the predictive data analysis computing entity 106 may transmit an SMS text, email notification, or auditory call notification informing the companion of his/her generated companion user identifier. The predictive data analysis computing entity 106 may also send a notification to the facility computing entity 110 indicating the request for one or more companion user identifiers has been completed.

In some embodiments, the response to the request for one or more companion user identifiers may also include the associated public user identifier and the associated access credentials associated with which the companion is associated with. In some embodiments, the public user identifier and associated access credentials may be provided in different responses such that a single response does not contain the companion user identifier, the public user identifier, and the associated access credentials. In this way, a companion may be provided with all the details needed to successfully access a portion of user information associated with the user described by the associated public user identifier.

Generation of an Aggregated Time Data Object

Figure 6:
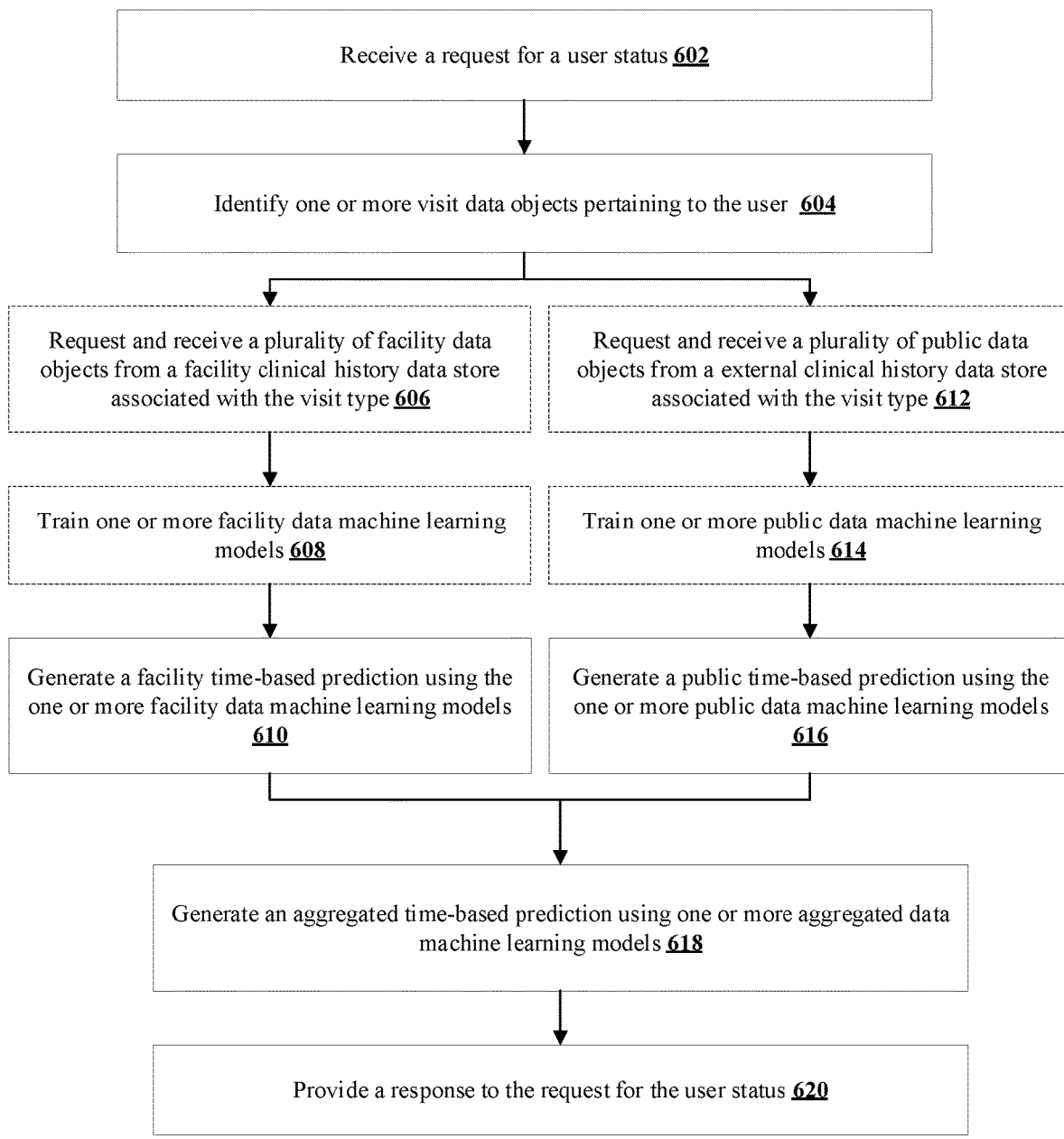

FIG. 6 is a flowchart diagram of an example process 600 for generating an aggregated time data object using one or more aggregated data machine learning models based at least in part on a facility time data object and a public time data object. Via the various steps/operations of the process 600, the predictive data analysis computing entity 106 can receive a request for a time-based user prediction and provide a response to the request based at least in part on the generated aggregated time data object indicative of at least a predicted duration of user visit to the facility. The aggregated time data object may also be indicative of a predicted departing time for the user to leave the facility, a predicted departing date for the user to leave the facility, and/or one or more predicted next events for the user visiting the facility.

At step/operation 602, the predictive data analysis computing entity 106 may receive a request for a time-based user prediction. The request for a time-based user prediction may comprise at least a public user identifier (e.g., jdoe). The predictive data analysis computing entity 106 may receive a request for a time-based user prediction in response to a request for a user status, as will be discussed with respect to FIG. 7. The request for a user status (e.g., visit status, time-based prediction, and/or the like) may be received from a companion associated with the user visiting the facility. Alternatively, the predictive data analysis computing entity 106 may update the time-based predictions for each user periodically, continuously, and/or in response to certain triggers. The request for a user status (e.g., visit status, time-based prediction, and/or the like) may automatically trigger a request for a time-based user prediction for the associated user described in the request for a user status. For example, a companion of a user who is a patient admitted in a healthcare facility may provide (e.g., transmit, send, etc.) a request a user status (e.g., visit status, time-based prediction, and/or the like) to the predictive data analysis computing entity 106. This request for a user status (e.g., visit status, time-based prediction, and/or the like) may automatically trigger the request for a time-based user prediction such that predicted discharge information may be presented to the companion of the user admitted to the healthcare facility in the response to the request for a user status (e.g., visit status, time-based prediction, and/or the like). In some embodiments the predictive data analysis computing entity 106 may automatically generate an aggregated time data object after generating the public user identifier. For example, after the predictive data analysis computing entity 106 generates one or more visit data objects for a user described by the public user identifier as described with respect to step/operation 412, the predictive data analysis computing entity 106 may automatically determine to generate an aggregated time data object. In some embodiments, the visit data object may describe the aggregated time data object, which may describe a predicted duration of user visit to a facility. In some embodiments, the aggregated time data object may also describe a predicted departing time for the user to leave the facility, a predicted departing date for the user to leave the facility, and/or one or more predicted next events for the user visiting the facility based at least in part on the facility time data object and the public time data object. In some embodiments, the aggregated time data object may be based at least in part on the facility time data object and/or the public time data object, which may each describe a predicted duration of user visit, a predicted departing time for the user to leave the facility, a predicted departing date for the user to leave the facility, and/or one or more predicted next events for the user visiting the facility based at least in part on the facility time data object and the public time data object. The generation of the facility time data object, public time data object, and aggregated time data object will be discussed herein below.

At step/operation 604, the predictive data analysis computing entity 106 may identify one or more visit data objects pertaining to the user. For example, the predictive data analysis computing entity 106 may identify the one or more visit data objects pertaining to the user by querying the storage subsystem 108 for the one or more visit data objects associated with the provided public user identifier. In some embodiments, the predictive data analysis computing entity 106 may identify the one or more visit data objects for the user as generated with respect to step/operation 412. In some embodiments, each visit data object of the one or more visit data objects may be associated with a unique visit data object identification identifier such that each visit data object is uniquely identifiable. In this way, individual visit data objects may be referenced and identifier to determine what user information each visit data object contained. In some embodiments, the predictive data analysis computing entity 106 may query storage subsystem 108 and/or mapping database 116 to determine one or more existing visit data objects associated with the public user identifier.

The visit data object for the user may describe user identifying information, such as a user's first name, last name, full name, date of birth, address, and user data such as medical records, events, scheduled tests, test results, diagnoses, and/or the like. The visit data object may also describe facility information, such as facility name, associated visit area, geographic location, facility, CMS CCN, NPI, facility type, control type, teaching status, bed size, and/or the like. In some embodiments, the visit data object describes a visit type. In some embodiments, the visit type may comprise one or more ICD codes, CPT, or diagnosis codes indicative of a user's visit reason and/or diagnosis.

Optionally, at step/operation 606, the predictive data analysis computing entity 106 may request and receive a plurality of facility data objects from one or more facility clinical history data stores, such as facility clinical history database 112, associated with the visit type described by the one or more visit data objects pertaining to the user. For example, the predictive data analysis computing entity 106 may determine one or more visit types associated with the one or more visit data objects for a user and use the one or more visit types to query the facility clinical history database 112 for the same one or more visit types. Returning to a previous example, if a user visits an emergency room for right ankle pain after a fall, the visit data object may indicate an ICD-10-CM code S80-S89 visit type, which is indicative of injuries to the knee and lower leg. The predictive data analysis computing entity 106 may then request facility clinical history database 112 for a plurality of facility data objects associated with the same ICD-10-CM code S80-S89. As another example, if a user is a patient who visits a healthcare facility and presents with abdominal pain, the user may be admitted and the visit data object may initially indicate an ICD-10-CM code R10, indicative of unspecified abdominal pain.

The received plurality of facility data objects may each describe an overall duration of other users' stays at a facility. In one embodiment, the other users may be in a similar cohort as the user. In some embodiments, the received plurality of facility data objects may describe an admittance visit time and/or date as well as a discharge time and/or date such that the overall duration of the users' stays. In some embodiments, the plurality of facility data objects may be anonymized prior to being received by the predictive data analysis computing entity 106. In some embodiments, the predictive data analysis computing entity 106 may select one or more facility data objects based at least in part on one or more associated data fields described by the one or more facility data objects. For example, the predictive data analysis computing entity 106 may select one or more facility data objects based at least in part on one or more associated demographic data fields described by a visit data object.

Optionally, at step/operation 608, the predictive data analysis computing entity 106 may train one or more facility data machine learning models using various training feature data objects. In some embodiments, the one or more facility data machine learning models may be trained to process one or more feature data objects to generate a facility time data object. The facility time data object (e.g., facility time-based prediction) may be indicative of an average duration of stay for a user at a specific facility, specialty area in a facility, or chain of facilities. In some embodiments, data from the plurality of facility data objects may be used as training data in the training feature data objects for the one or more facility data machine learning models. In some embodiments, the predictive data analysis computing entity 106 may train the one or more facility data machine learning models, for instance, by optimizing a loss function between an inferred facility time data object generated by an untrained facility data machine learning model and a ground-truth facility time data object as determined based at least in part on the plurality of facility data objects. In some embodiments, the one or more facility data machine learning models are trained facility data machine learning models. In some embodiments, the one or more facility data machine learning models may be periodically retrained on a regular basis, such as weekly, monthly, or yearly, or in response to certain triggers. In some embodiments, the one or more facility data machine learning models may be retrained based at least in part on a received user input indicative to retrain the one or more facility data machine learning models. In some embodiments, the one or more facility data machine learning models may be implemented as regression models, neural network models, deep learning models, and/or the like.

At step/operation 610, the predictive data analysis computing entity 106 may generate a facility time data object by the one or more trained facility data machine learning models. The one or more trained facility data machine learning models may process the one or more feature data objects generated from the visit data object for the user and/or the one or more facility data objects to generate a facility time data object for the user. For example, the trained facility data machine learning model may process one or more feature data objects describing a visit type, user demographic information, diagnoses, tests, facility information, and/or the like. In other words, the one or more trained facility data machine learning models generate facility-based predictions based at least in part on user information and facility information. The generated facility time data object is the output of the one or more trained facility data machine learning models. Thus, the facility time data object for the user may describe predicted outputs associated with a visit duration. In some embodiments, the facility time data object (e.g., facility time-based prediction) may also describe a predicted departing time for the user to leave the facility and/or a predicted departing date for the user to leave the facility. In some embodiments, the facility time data object may also describe one or more predicted next events for the user. The facility time data object (e.g., facility time-based prediction) may also describe a predicted visit duration based at least in part on the particular facility, specialty, area in the facility, or chain of facilities such that the facility time data object is indicative of a predicted duration, predicted departing time, predicted departing date, and/or one or more predicted next events for a user that based at least in part on the facility data. For example, a user may be a patient admitted to a healthcare facility which typically discharges patients quicker than other healthcare facilities. The facility time data object may describe a predicted duration of user visit of 24 hours, a predicted departing time for the user to leave the facility of 3:00 pm, a predicted departing date for the user to leave the facility of Thursday, March 1, and/or a predicted next event of receiving MRI results.

In some embodiments, the facility time data object (e.g., facility time-based prediction) may further comprise a confidence score associated with the predicted facility visit duration, predicted facility departing time, predicted facility departing date, one or more predicted next events, and/or the like. For example, if the one or more facility data machine learning models determine that the facility time data object for the user with a visit type of S80-S89 is indicative of an average duration stay of less than one day, an associated confidence score (e.g., between 0 and 1) may indicate confidence of the prediction for the user. As will be recognized, a variety of other approaches and techniques may also be used.

Optionally, at step/operation 612, the predictive data analysis computing entity 106 may request and receive a plurality of public data objects from one or more public clinical history data stores, such as public clinical history database 114, associated with the visit type described by the one or more visit data objects pertaining to the user. For example, the predictive data analysis computing entity 106 may determine one or more visit types associated with the one or more visit data objects for a user and use the one or more visit types to query the public clinical history database 114 for the same one or more visit types. Returning to a previous example, if a user visits an emergency room for right ankle pain after a fall, the visit data object may indicate an ICD-10-CM code S80-S89 visit type, which is indicative of injuries to the knee and lower leg. The predictive data analysis computing entity 106 may then request public clinical history database 114 for a plurality of public data objects associated with the same ICD-10-CM code S80-S89. As another example, if a user is a patient who visits a healthcare facility and presents with abdominal pain, the user may be admitted and the visit data object may initially indicate an ICD-10-CM code R10, indicative of unspecified abdominal pain.

The received plurality of public data objects may each describe an overall duration of another users' stays at facilities based at least in part on a particular geographic area (e.g., country, province, state, county, city, and/or the like). In one embodiment, the other users may be in a similar cohort as the user. In some embodiments, the received plurality of public data objects may describe an admittance visit time and/or date as well as a discharge time and/or date such that the overall duration of the users' stays. In some embodiments, the plurality of public data objects may be anonymized prior to being received by the predictive data analysis computing entity 106. In some embodiments, the predictive data analysis computing entity 106 may select one or more public data objects based at least in part on one or more associated data fields described by the one or more public data objects. For example, the predictive data analysis computing entity 106 may select one or more public data objects based at least in part on one or more associated demographic data fields described by a visit data object.

Optionally, at step/operation 614, the predictive data analysis computing entity 106 may train one or more public data machine learning models using various training feature data objects. In some embodiments, the one or more public data machine learning models may be trained to process one or more feature data objects to generate a public time data object. The public time data object (e.g., public time-based prediction) may be indicative of an average duration of stay for a user at a specific facility, specialty area in a facility, or chain of facilities in the specified geographic area. In some embodiments, data from the plurality of public data objects may be used as training data in the training feature data objects for the one or more public data machine learning models. In some embodiments, the predictive data analysis computing entity 106 may train the one or more public data machine learning models, for instance, by optimizing a loss function between an inferred public time data object generated by an untrained public data machine learning model and a ground-truth public time data object as determined based at least in part on the plurality of public data objects. In some embodiments, the one or more public data machine learning models are trained publicly accessible machine learning models. In some embodiments, the one or more public data machine learning models may be periodically retrained on a regular basis, such as weekly, monthly, or yearly, or in response to certain triggers. In some embodiments, the one or more public data machine learning models may be retrained based at least in part on a received user input indicative to retrain the one or more public data machine learning models. In some embodiments, the one or more public data machine learning models may be implemented as regression models, neural network models, deep learning models, and/or the like.

At step/operation 616, the predictive data analysis computing entity 106 may generate a public time data object by the one or more trained public data machine learning models. The one or more trained public data machine learning models may process the one or more feature data objects generated from the visit data object for the user and/or the one or more public data objects to generate a public time data object for the user. For example, the trained public data machine learning model may process one or more feature data objects describing a visit type, user demographic information, diagnoses, tests, facility information, and/or the like. In other words, the one or more trained public data machine learning models generate facility-based predictions based at least in part on user information and facility information. The generated public time data object is the output of the one or more trained public data machine learning models. Thus, the public time data object for the user may describe predicted outputs associated with a visit duration. In some embodiments, the public time data object (e.g., public time-based prediction) may also describe a predicted departing time for the user to leave the facility, a predicted departing date for the user to leave the facility, and/or one or more predicted next events for the user visiting the facility. The public time data object (e.g., public time-based prediction) may also describe predicted outputs associated with a visit duration based at least in part on one or more facilities such that the public time data object is indicative of a predicted duration, predicted departing time, and/or predicted departing date for a user that based at least in part on the public data. In some embodiments, the public time data object may also describe one or more predicted next events for the user.

For example, a user may be a patient admitted to a healthcare facility in a geographic area that which typically discharges patients quicker than other geographic areas. The public time data object (e.g., public time-based prediction) may describe an predicted duration of user visit of 18 hours, an predicted departing time for the user to leave the facility of 9:00 am, a predicted departing date for the user to leave the facility of Thursday, March 1, and/or a predicted next event of receiving MRI results.

In some embodiments, the public time data object (e.g., public time-based prediction) may further comprise a confidence score associated with the predicted public visit duration, predicted public departing time, predicted public departing date, one or more predicted next events and/or the like. For example, if the one or more public data machine learning models determine that the public time data object for the user with a visit type of S80-S89 is indicative of an average duration stay of less than one day, an associated confidence score (e.g., between 0 and 1) may indicate confidence of the prediction for the user. As will be recognized, a variety of other approaches and techniques may also be used.

In one embodiment, with the facility time data object (e.g., facility time-based prediction) and the public time data object (e.g., public time-based prediction), at step/operation 618, the predictive data analysis computing entity 106 may generate an aggregated time data object (e.g., aggregated time-based prediction) using one or more aggregated data machine learning models. In some embodiments, the input data (e.g. the facility time data object and the public time data object) may be pre-processed by a pre-processing layer prior to being input to an aggregated data machine learning model. In some embodiments, the pre-processing layer may process the outputs of the facility time data object and the public time data object such that the facility time data object and the public time data object are transformed into a suitable format for processing by the one or more aggregated data machine learning models. In some embodiments, the pre-processing layer may process the outputs of the facility time data object and the public time data object to clean, select, normalize, transform, extract, or otherwise prepare the outputs for input and processing by the one or more aggregated data machine learning models.

With the appropriate data, the one or more aggregated data machine learning models may process the facility time data object (e.g., facility time-based prediction) and the public time data object (e.g., public time-based prediction) to generate an aggregated time data object (e.g., aggregated time-based prediction) for the user. In some embodiments, the facility time data object and public time data object may each be associated with a weighting coefficient indicative of the respective weights given to each score. In some embodiments, the respective weighting coefficients may be configured by a facility user, such as an administrator. In some embodiments, the respective weighting coefficients may be determined dynamically by the one or more aggregated data machine learning models. The resulting aggregated time data object (e.g., aggregated time-based prediction) for the user may describe a predicted duration of a user visit to a facility based at least in part on the specific facility the user is visiting and publicly available data. In some embodiments, the aggregated time data object may also describe a predicted departing time for the user to leave the facility, a predicted departing date for the user to leave the facility, and/or one or more predicted next events for the user visiting the facility. The aggregated time data object (e.g., aggregated time-based prediction) may also describe predicted outputs associated with a visit duration for the user indicative of a predicted duration, predicted departing time, predicted departing date for a user, and/or one or more predicted next events for the user visiting the facility that based at least in part on the facility data and public data. For example, if the facility time data object described a predicted duration of user visit of 24 hours, a predicted departing time for the user to leave the facility of 3:00 pm, a predicted departing date for the user to leave the facility of Thursday, March 1, and a predicted next event of receiving MRI results, and the public time data object described a predicted duration of user visit of 18 hours, a predicted departing time for the user to leave the facility of 9:00 am, a predicted departing date for the user to leave the facility of Thursday, March 1, and a predicted next event of receiving MM results the aggregated time data object (e.g., aggregated time-based prediction) may describe a predicted duration of user visit of 21 hours, a predicted departing time for the user to leave the facility of 12:00 pm, a predicted departing date for the user to leave the facility of Thursday, March 1, and a predicted next event of receiving MRI results. This scenario assumes equal weighting to both facility time data object and public time data object. However, as will be recognized, a variety of other approaches and techniques can be used to adapt to various needs and circumstances.

In this way, the aggregated time data object (e.g., aggregated time-based prediction) may reflect a more customized predicted stay duration for the user visiting the facility. For example, if the user is visiting a facility with exceptionally quick service, the aggregated time data object may reflect a predicted stay duration that is shorter than the average stay duration for other facilities. As another example, if the user is visiting a facility and has an uncommon associated visit type for the particular facility, the facility time data object (e.g., facility time-based prediction) may not be accurate due to the limited availability of facility data with similar visit types. Therefore, consideration of the public time data by the one or more aggregated data machine learning models may be beneficial to generate an overall accurate aggregated time data object. Additionally, because the aggregated data machine learning models receive as input the output of the facility data machine learning model and/or a public data machine learning model, the aggregated data machine learning models avoids the runtime efficiency issues of various existing machine learning models and thus improve the speed of performing an accurate and dynamic aggregated time data object for a user in a facility in a real-time or near-real-time manner.

In some embodiments, the aggregated time data object (e.g., aggregated time-based prediction) may further comprise a confidence score associated with the predicted aggregated visit duration, predicted aggregated departing time, predicted aggregated departing date, one or more predicted next events and/or the like. For example, if the one or more aggregated data machine learning models determine that the aggregated time data object for the user with a visit type of S80-S89 is indicative of an average duration stay of less than one day, an associated confidence score (e.g., between 0 and 1) may indicate confidence of the prediction for the user. As will be recognized, a variety of other approaches and techniques may also be used.

With the aggregated time data object, at step/operation 620, the predictive data analysis computing entity 106 may provide a response to the request for a time-based user prediction. In some embodiments the response may comprise the aggregated time-based confidence score as generated by the one or more aggregated data machine learning models. In some embodiments, the response to the request for a time-based user prediction may comprise updating one or more visit data objects associated with the user (e.g., corresponding to the public user identifier). As such, the one or more visit data objects may be provided with a time-based prediction indicative of a predicted user stay duration (e.g., with a predicted aggregated visit duration, a predicted aggregated departing time, a predicted aggregated departing date, and/or one or more predicted next events along with respective confidence scores). In some embodiments, the response to the request for a time-based user prediction may further comprise the associated confidence score(s).

Authenticating a Request for a User Status

Figure 7:
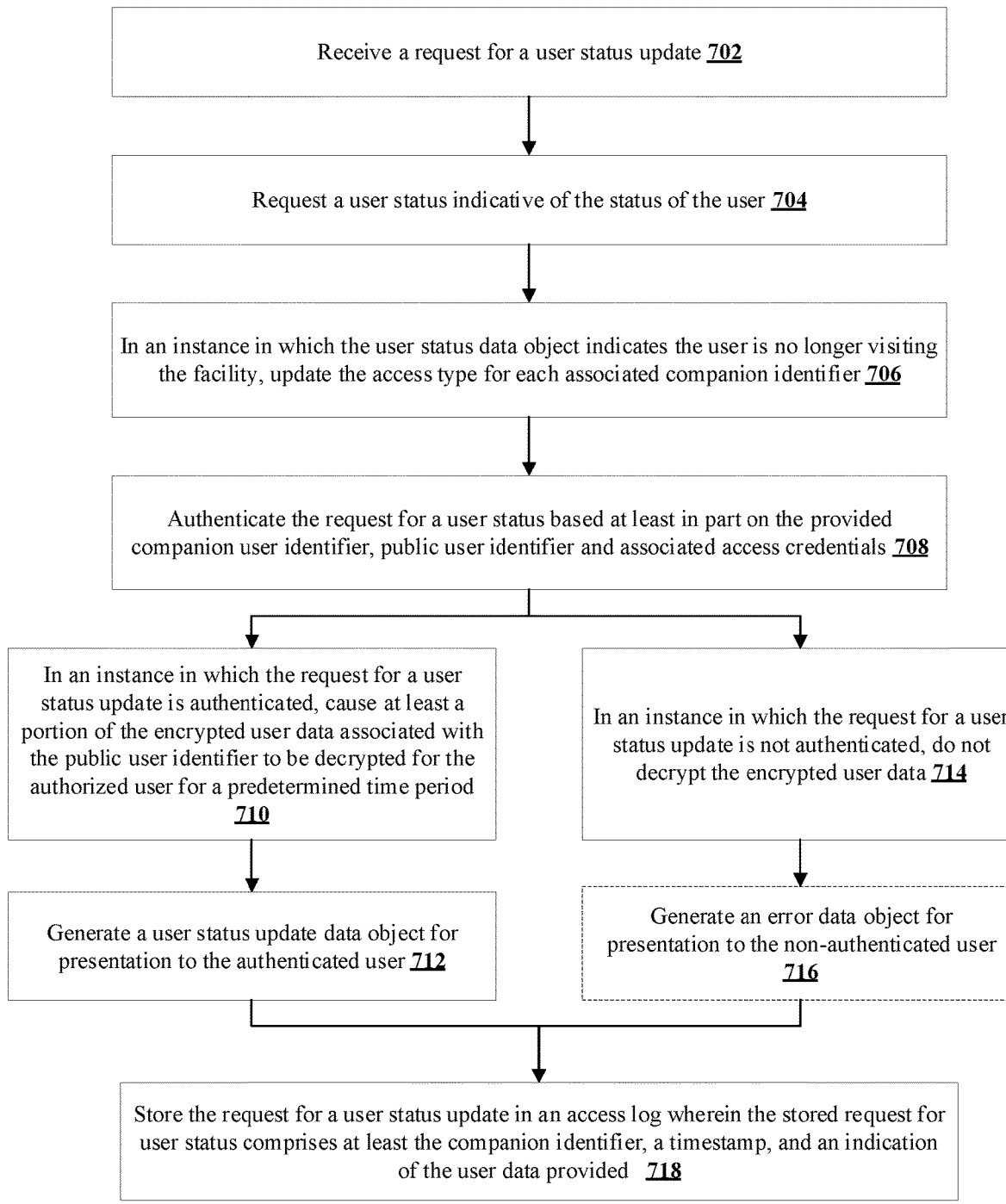

FIG. 7 is a flowchart diagram of an example process 700 for receiving a request for a user status (e.g., visit status, time-based prediction, and/or the like) and processing the same. Via the various steps/operations of the process 700, the predictive data analysis computing entity 106 can authenticate the request for a user status, and in an instance in which the request for a user status (e.g., visit status, time-based prediction, and/or the like) is successfully authenticated, decrypt user data and generate a user status (e.g., visit status, time-based prediction, and/or the like) for presentation to the authenticated user. For example, the predictive data analysis computing entity 106 may receive the request in response to a user status (e.g., visit status, time-based prediction, and/or the like) request from a companion associated with the user. Returning to the healthcare example, the user may be a patient admitted to a healthcare facility. In this way, an authenticated user, such as a companion, may be provided with information pertaining to an associated user visiting a facility without physically accompanying the user.

At step/operation 702, the predictive data analysis computing entity 106 may receive a request for a user status (e.g., visit status, time-based prediction, and/or the like) comprising at least a companion user identifier with associated access credentials. In some embodiments, the predictive data analysis computing entity 106 may receive this request from an external computing entity 102, such as an external computing entity associated with a companion. For example, a companion may request a user status (e.g., visit status, time-based prediction, and/or the like) via his/her mobile phone for an associated user. The associated user may be patient admitted to a healthcare facility. The companion, such as the previously described companion "John Smith," may provide the public user identifier jdoe, associated access credentials 01Doe19, and companion user identifier/smith to the predictive data analysis computing entity 106. In one embodiment, the public user identifier may be provided as part of the request. In another embodiment, the companion user identifier may be mapped to one or more public user identifiers from which to select (or be automatically selected if only associated with one).

In some embodiments, the request for a user status (e.g., visit status, time-based prediction, and/or the like) may be received by the predictive data analysis computing entity 106 automatically in response to a user entering a public user identifier, associated access credentials, and/or companion user identifier into a user application associated or otherwise in communication with predictive data analysis computing entity 106. The user application may be resident on a user computing entity, such as external computing entity 102, or accessible through a browser or other user interface in communication with the predictive data analysis computing entity 106 and/or various other computing entities. For example, a companion may utilize a mobile application associated with one or more facilities, such as one or more healthcare facilities, and may be prompted to enter a public user identifier, associated access credentials, and companion user identifier. Upon the user entering the requested information, the predictive data analysis computing entity 106 may automatically receive a request for a user status (e.g., visit status, time-based prediction, and/or the like) for the user described by the public user identifier and/or mapped to one or more public user identifiers.

At step/operation 704, the predictive data analysis computing entity 106 may request a user status from a facility computing entity 110. The user status may be indicative of at least the status of the user corresponding to the public user identifier. The predictive data analysis computing entity 106 may receive the user status from a facility computing entity 110 and determine whether a user is still admitted to a facility. In the healthcare context, if the user is no longer admitted to the facility, the user status may further indicate a time the user left the facility. In some embodiments, the predictive data analysis computing entity 106 may be determine whether the time the user left the facility is within a preconfigured time frame. The preconfigured time frame may be configured by a facility user, such as a facility administrator. For example, the preconfigured time frame may be indicative of a timeframe within 24 hours. The predictive data analysis computing entity 106 may then determine whether the user left the facility within less than 24 hours. In the instance in which the user has left the facility within less than 24 hours, the user may still be considered as visiting the facility. In the instance in which the user has left the facility at a time over 24 hours from the current time, the user may no longer be considered to be visiting the facility. In this way, access to user information is not immediately suspended upon the user leaving the facility.

At step/operation 706, the predictive data analysis computing entity 106 may update the access type for each associated companion user identifier In the instance in which the user status indicates the user is no longer visiting the facility. In some embodiments, the predictive data analysis computing entity 106 may update each companion user identifier to no access, such that previously authorized companions may no longer access any information pertaining to the user previously visiting the facility. Revoking all previously authorized companions from further accessing user information after the user has left the facility, ensures that user privacy is protected and maintained after the user leaves the facility. For example, if the user is a patient who has been discharged from a healthcare facility, the one or more associated companions may no longer access any medical information pertaining to the user, thus ensuring the user's medical records are secure and no longer accessible without requiring user intervention. In the instance in which the user status indicates the user is still visiting the facility, the predictive data analysis computing entity 106 may leave the access type for each associated companion user identifier unchanged.

In some embodiments, the predictive data analysis computing entity 106 may automatically update the access type for each associated companion user identifier in the event a user leaves a facility. For example, in the event a user is discharged from a healthcare facility, a facility computing entity 106 may provide an indication to the predictive data analysis computing entity 106 indicative that a user has been discharged from the facility. In some embodiments, the indication may comprise a private user identifier such that predictive data analysis computing entity 106 may update the access type for each associated companion user identifier by utilizing the mapping database 116. In some embodiments, the predictive data analysis computing entity 106 may wait a predetermined amount of time prior to updating the access type for each associated companion user identifier for the public user identifier as previously described.

In the event that a user returns to a facility, the user may repeat the processes associated with FIGS. 4 and 5 such that a new public user identifier, associated access credentials, and one or more companion user identifiers may be generated. In some embodiments, the predictive data analysis computing entity 106 may access the previously associated one or more companion user identifiers for a user described in a new request for a public user identifier such that the one or more companion user identifiers may be reused. In some embodiments, the user associated with the one or more companion user identifiers may be informed of the one or more previously associated companions and choose to allow the same associated companions access to user information. The user may also choose to update an access type of each previously associated companion. If the user visiting the facility chooses to allow the previously associated companions access to user information, the one or more companion user identifiers may automatically be associated with the newly generated public user identifier. In some embodiments, the companions associated with the previously associated companion user identifiers may be provided with an indication of the new public user identifier and associated access credentials in a similar manner as described with respect to step/operation 510. In this way, this may save a user time from having to request the same companion user identifiers for each facility visit. For example, if a user is a frequent patient at a healthcare facility, this saves the user and one or more associated companions time and allows the user and one or more associated companions to retain the same public user identifier and companion user identifier, thereby preventing the user and companion from needing to memorize a new public user identifier, companion user identifier, and associated access credentials each time the user is admitted to the healthcare facility.

At step/operation 708, the predictive data analysis computing entity 106 may authenticate the request for a user status (e.g., visit status, time-based prediction, and/or the like) based at least in part on the provided companion user identifier, public user identifier, and associated access credentials. In some embodiments, the predictive data analysis computing entity 106 may authenticate this request accessing the mapping associated with the public user identifier stored in mapping database 118. For example, predictive data analysis computing entity 106 may access the associated mapping via an index and/or hash function. In some embodiments, the predictive data analysis computing entity 106 may compare the companion user identifier received in the request for a user status to one or more companion user identifiers associated with the public user identifier as stored in the storage subsystem 108 and/or mapping database 116. The predictive data analysis computing entity 106 may also compare the associated access credentials received in the request for a user status to the credentials associated with the public user identifier as stored in the storage subsystem 108 and/or mapping database 116. Additionally, the predictive data analysis computing entity 106 may determine the access type for the companion user identifier.

In an instance in which the companion user identifier is determined to be associated with the provided public user identifier, the companion user identifier has an access type indicative of some level of access to user information, and the provided associated access credentials match the credentials associated with the public user identifier, the request for user access is authenticated. For example, the companion user identifier may have an access type indicative of no access in the event a user was discharged from a healthcare facility. As another example, the companion user identifier may have an access type indicative of no access in the event that an associated user revoked the companions associated access during his/her visit to the facility. As yet another example, the companion user identifier may have an access type indicative of somewhat restricted access type in the event the associated user is still visiting the facility.

At step/operation 710, the predictive data analysis computing entity 106 may decrypt at least a portion of the encrypted user data associated with the public user identifier for an authenticated user in an instance in which the request for a user status is authenticated and based at least in part on the companion user identifier access type. In some embodiments, the encrypted user data may be described by one or more associated user visit data objects. In some embodiments, the encrypted user data may be described by one or more feature data objects comprising the visit data object. In some embodiments, the encrypted user data may be described by one or more data fields described by one or more feature data object. In some embodiments, the portion of user data decrypted is based at least in part on the associated access type for the companion user identifier. For example, if the companion user identifier indicates a restricted access type, only one or more feature data objects describing an aggregated time data object, facility time data object, and/or public time data object indicative of a predicted duration of visit for the user in the facility may be decrypted. A somewhat restricted access type may provide controlled access to one or more feature data objects describing an aggregated time data object, facility time data object, and/or public time data object and additional access to one or more feature data objects describing current visit data but not access to one or more feature data objects historical user data associated with one or more previous user visits for the user described by a public user identifier. An unrestricted access type may be provided access to one or more feature data objects describing an aggregated time data object, facility time data object, and/or public time data object, current visit data and historical visit data associated with one or more previous user visits for the user described by a public user identifier. Additionally or alternatively, the predictive status data object may decrypt one or more feature data objects comprising facility information, such as the facility name.

The predictive data analysis computing entity 106 may decrypt the portion of the encrypted user data for a predetermined time period. After the predetermined time period has passed, the authenticated user may be required to generate a new request for a user status. For example, the predictive data analysis computing entity 106 may decrypt the portion of the encrypted user data for five minutes for the authenticated user, such as a companion. After the 5-minute time period has passed, the user data may be re-encrypted, and the authenticated user may be required to generate another request for a user status to re-access the user data. The predetermined time period may be a configurable parameter managed by a facility user, such as a facility administrator. In this way, the user's data is only accessible for a limited time even for an authenticated user.

At step/operation 712, the predictive data analysis computing entity 106 may generate a user status (e.g., visit status, time-based prediction, and/or the like) data object for presentation to the authorized user. In some embodiments, the user status (e.g., visit status, time-based prediction, and/or the like) data object may comprise only the decrypted information as decrypted in step/operation 710. In some embodiments, the user status (e.g., visit status, time-based prediction, and/or the like) data object may comprise visual data describing the decrypted information. In some embodiments, the predictive data analysis computing entity 106 may transmit the user status (e.g., visit status, time-based prediction, and/or the like) data object to the computing entity that requested the request for a user status such that it may be viewed by the authenticated user. FIG. 8 will further describe the presented user status in more detail.

At step/operation 714, the predictive data analysis computing entity 106 may not decrypt any encrypted user data associated with the public user identifier for a user in an instance in which the request for a user status is not authenticated. For example, the predictive data analysis computing entity 106 may not authenticate the request for a user status (e.g., visit status, time-based prediction, and/or the like) in the event the mapping is not found in the mapping database 118. Optionally, at step/operation 716, the predictive data analysis computing entity 106 may generate an error data object for presentation to the non-authenticated user. In some embodiments, the error data object may comprise visual data describing an error has occurred with the request for a user status. In some embodiments, the predictive data analysis computing entity 106 may transmit the user status to the computing entity that requested the request for a user status such that it may be viewed by the non-authenticated user. FIG. 9 will further describe the presented error data object in more detail.

At step/operation 718, the predictive data analysis computing entity 106 may store the request for a user status (e.g., visit status, time-based prediction, and/or the like) in an access log 118. The stored request for user status may comprise the companion user identifier, a timestamp indicative of when the request for the user status (e.g., visit status, time-based prediction, and/or the like) was received, and an indication of the user data provided. The predictive data analysis computing entity 106 may store the request for user status in the access log 118, regardless of whether the request for user status was authenticated such that all received requests for a user status are stored and may be monitored. In this way, the predictive data analysis computing entity 106 may track each access attempt for access to user information.

The predictive data analysis computing entity 106 may track exactly what user information was provided to an authenticated user. In some embodiments, the predictive data analysis computing entity 106 may store the encrypted one or more visit data objects and/or time data objects with the authenticated request for user status in the access log 118. In some embodiments, a description of the user information provided may be stored with the authenticated request for user status in the access log 118. For example, in an instance in which the portion of user data decrypted included a time-based prediction and user data pertaining to the current facility visit, the stored indication of the user data provided may indicate that time-based prediction and user data pertaining to the current facility visit was decrypted but may not comprise the actual time-based user prediction or user data pertaining to the current facility visit. In some embodiments, the associated visit data object identification identifier may be stored with the authenticated request for a user status.

An operational example of a user status (e.g., visit status, time-based prediction, and/or the like) data object presented to an authenticated user is depicted in FIG. 8. As depicted in FIG. 8, the user status (e.g., visit status, time-based prediction, and/or the like) data object 800 depicts information pertaining to a user visiting a facility. In particular, FIG. 8 depicts healthcare information pertaining to a patient admitted to a healthcare facility. The user status 800 includes the user identifying information 802, such as a username, public user identifier, and a user phone number as described by one or more visit data objects and/or one or more feature data objects. Additionally, the user status 800 may include associated user data 804 indicative of user events, scheduled tests, test results, diagnoses, and/or the like as described by one or more visit data objects and/or one or more feature data objects. In some embodiments, associated user data 804 may be associated with a time stamp such that the associated user data 804 may be presented to an authenticated user in chronological order. The user status (e.g., visit status, time-based prediction, and/or the like) data object 800 may also include a time-based prediction 806, such as the facility time-based prediction, the public time-based prediction, and/or the aggregated time-based prediction data object generated by the one or more machine learning models. The user status (e.g., visit status, time-based prediction, and/or the like) data object 800 may also include facility information 808 indicative of the facility the user is currently visiting as described by one or more visit data objects and/or one or more feature data objects.

An operational example of an error data object presented to a non-authenticated user is depicted in FIG. 9. As depicted in FIG. 9, the error data object 900 depicts an error notification 902 indicating there was an error during the request for a user status (e.g., visit status, time-based prediction, and/or the like). In some embodiments, the error notification 902 may be a generic error notification that does not describe why the requesting user was not authenticated. In some embodiments, the error notification 902 may describe the reason a user was not authenticated. For example, if the requesting user was not authenticated due to the companion described by the companion user identifier not being associated with the user visiting the facility, the error notification 902 may indicate this to the requesting user.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for dynamically generating a time-based prediction and controlling access to the time-based prediction, the computer-implemented method comprising:

storing, by one or more processors, a companion user identifier in association with a public user identifier, wherein (a) the public user identifier corresponds to a user, (b) the public user identifier maps to a private user identifier that corresponds to the user, (c) the companion user identifier corresponds to a companion user, and (d) the companion user identifier is configured to provide the companion user with access to a time-based prediction associated with the user;

receiving, by the one or more processors, a request for a user status of the user, wherein the request for the user status of the user originates from a computing entity of the companion user;

responsive to authenticating the companion user based at least in part one access credentials of the companion user, determining, by the one or more processors, whether the companion user is permitted to receive the user status of the user based at least in part on the public user identifier and the companion user identifier;

responsive to determining that the companion user is permitted to receive the user status of the user, requesting, by the one or more processors, an aggregated time-based prediction for the user, wherein the aggregated time-based prediction (a) is generated by one or more aggregated data machine learning models based at least in part on a facility time-based prediction and a public time-based prediction, (b) the facility time-based prediction is generated by one or more facility data machine learning models, (c) the public time-based prediction is generated by one or more public data machine learning models, and (d) the aggregated time-based prediction is indicative of a visit duration of the user; and causing, by the one or more processors, the aggregated time-based prediction to be decrypted and provided as a response to the request for the user status of the user.

2. The computer-implemented method of claim 1, further comprising:
receiving a request for a public user identifier, wherein the request for a public user identifier comprises the private user identifier;
generating the public user identifier and associating user access credentials with the public user identifier;
generating a mapping from the public user identifier to the private user identifier; and
generating a visit data object for the user.

3. The computer-implemented method of claim 2, further comprising requesting one or more history data objects associated with the user, wherein the one or more clinical history data objects comprise history data associated with the user.

4. The computer-implemented method of claim 1, further comprising:
receiving a request for a companion user identifier;
generating a companion user identifier;
assigning an access type to the companion user identifier based at least in part on an associated companion indicator; and
associating the companion user identifier with the public user identifier.

5. The computer-implemented method of claim 1, further comprising identifying one or more visit data objects associated with a visit of the user to the facility, wherein (a) the one or more visit data objects are used to generate one or more feature data objects, (b) a first feature data object is used as input for the one or more facility data machine learning models, and (c) a second feature data object is used as input for the one or more public data machine learning models.

6. The computer-implemented method of claim 5, further comprising:
training the one or more facility data machine learning models using one or more facility data objects;
training the one or more public data machine learning models using one or more public data objects; and
training the one or more aggregated data machine learning models using the one or more facility data objects and the one or more public data objects.

7. The computer-implemented method of claim 1, further comprising logging the request for the user status of the user.

8. An apparatus for dynamically generating a time-based prediction and controlling access to the time-based prediction, the apparatus comprising at least one processor and at least one memory including program code, the at least one memory and the program code configured to, with the processor, cause the apparatus to at least:
store a companion user identifier in association with a public user identifier, wherein (a) the public user identifier corresponds to a user, (b) the public user identifier maps to a private user identifier that corresponds to the user, (c) the companion user identifier corresponds to a companion user, and (d) the companion user identifier is configured to provide the companion user with access to a time-based prediction associated with the user;
receive a request for a user status of the user, wherein the request for the user status of the user originates from a computing entity of the companion user;
responsive to authenticating the companion user based at least in part one access credentials of the companion user, determine whether the companion user is permitted to receive the user status of the user based at least in part on the public user identifier and the companion user identifier;
responsive to determining that the companion user is permitted to receive the user status of the user, request an aggregated time-based prediction for the user, wherein the aggregated time-based prediction (a) is generated by one or more aggregated data machine learning models based at least in part on a facility time-based prediction and a public time-based prediction, (b) the facility time-based prediction is generated by one or more facility data machine learning models, (c) the public time-based prediction is generated by one or more public data machine learning models, and (d) the aggregated time-based prediction is indicative of a visit duration of the user; and
cause the aggregated time-based prediction to be decrypted and provided as a response to the request for the user status of the user.

9. The apparatus of claim 8, further configured to:
receive a request for a public user identifier, wherein the request for a public user identifier comprises the private user identifier;
generate the public user identifier and associating user access credentials with the public user identifier;
generate a mapping from the public user identifier to the private user identifier; and
generate a visit data object for the user.

10. The apparatus of claim 9, further configured to request one or more history data objects associated with the user, wherein the one or more clinical history data objects comprise history data associated with the user.

11. The apparatus of claim 8, further configured to:
receive a request for a companion user identifier;
generate a companion user identifier;
assign an access type to the companion user identifier based at least in part on an associated companion indicator; and
associate the companion user identifier with the public user identifier.

12. The apparatus of claim 8, further configured to identify one or more visit data objects associated with a visit of the user to the facility, wherein (a) the one or more visit data objects are used to generate one or more feature data objects, (b) a first feature data object is used as input for the one or more facility data machine learning models, and (c) a second feature data object is used as input for the one or more public data machine learning models.

13. The apparatus of claim 8, further configured to: train the one or more facility data machine learning models using one or more facility data objects; train the one or more public data machine learning models using one or more public data objects; and train the one or more aggregated data machine learning models using the one or more facility data objects and the one or more public data objects.

14. The apparatus of claim 8, further configured to log the request for the user status of the user.

15. A non-transitory computer program product for dynamically generating a time-based prediction and controlling access to the time-based prediction, the computer program product comprising at least one non-transitory computer-readable storage medium having computer-readable program code portions stored therein, the computer-readable program code portions configured to: store a companion user identifier in association with a public user identifier, wherein (a) the public user identifier corresponds to a user, (b) the public user identifier maps to a private user identifier that corresponds to the user, (c) the companion user identifier corresponds to a companion user, and (d) the companion user identifier is configured to provide the companion user with access to a time-based prediction associated with the user; receive a request for a user status of the user, wherein the request for the user status of the user originates from a computing entity of the companion user; responsive to authenticating the companion user based at least in part one access credentials of the companion user, determine whether the companion user is permitted to receive the user status of the user based at least in part on the public user identifier and the companion user identifier; responsive to determining that the companion user is permitted to receive the user status of the user, request an aggregated time-based prediction for the user, wherein the aggregated time-based prediction (a) is generated by one or more aggregated data machine learning models based at least in part on a facility time-based prediction and a public time-based prediction, (b) the facility time-based prediction is generated by one or more facility data machine learning models, (c) the public time-based prediction is generated by one or more public data machine learning models, and (d) the aggregated time-based prediction is indicative of a visit duration of the user; and cause the aggregated time-based prediction to be decrypted and provided as a response to the request for the user status of the user.

16. The non-transitory computer program product of claim 15, further configured to: receive a request for a public user identifier, wherein the request for a public user identifier comprises the private user identifier; generate the public user identifier and associating user access credentials with the public user identifier; generate a mapping from the public user identifier to the private user identifier; and generate a visit data object for the user.

17. The non-transitory computer program product of claim 16, further configured to request one or more history data objects associated with the user, wherein the one or more clinical history data objects comprise history data associated with the user.

18. The non-transitory computer program product of claim 15, further configured to: receive a request for a companion user identifier; generate a companion user identifier; assign an access type to the companion user identifier based at least in part on an associated companion indicator; and associate the companion user identifier with the public user identifier.

19. The non-transitory computer program product of claim 15, further configured to identify one or more visit data objects associated with a visit of the user to the facility, wherein (a) the one or more visit data objects are used to generate one or more feature data objects, (b) a first feature data object is used as input for the one or more facility data machine learning models, and (c) a second feature data object is used as input for the one or more public data machine learning models.

20. The non-transitory computer program product of claim 19, further configured to: train the one or more facility data machine learning models using one or more facility data objects; train the one or more public data machine learning models using one or more public data objects; and train the one or more aggregated data machine learning models using the one or more facility data objects and the one or more public data objects.

* * * * *